(12) United States Patent
Lasserre et al.

(10) Patent No.: US 11,548,740 B2
(45) Date of Patent: Jan. 10, 2023

(54) TRANSFER DEVICE

(71) Applicant: PRODEL TECHNOLOGIES, Carlepont (FR)

(72) Inventors: Didier Lasserre, Vauchelles (FR); Maurice Dieu De Bellefontaine, Compiegne (FR)

(73) Assignee: PRODEL TECHNOLOGIES, Carlepont (FR)

( * ) Notice: Subject to any disclaimer, the term of this patent is extended or adjusted under 35 U.S.C. 154(b) by 0 days.

(21) Appl. No.: 17/257,362

(22) PCT Filed: Jun. 28, 2019

(86) PCT No.: PCT/EP2019/067406
§ 371 (c)(1),
(2) Date: Dec. 31, 2020

(87) PCT Pub. No.: WO2020/007745
PCT Pub. Date: Jan. 9, 2020

(65) Prior Publication Data
US 2021/0269259 A1 Sep. 2, 2021

(30) Foreign Application Priority Data
Jul. 3, 2018 (FR) ...................... 1856122

(51) Int. Cl.
*B65G 54/02* (2006.01)
*B65G 35/06* (2006.01)
*B65G 37/00* (2006.01)

(52) U.S. Cl.
CPC .......... *B65G 54/02* (2013.01); *B65G 35/063* (2013.01); *B65G 37/00* (2013.01)

(58) Field of Classification Search
CPC ....... B65G 54/02; B65G 35/063; B65G 37/00
See application file for complete search history.

(56) References Cited

U.S. PATENT DOCUMENTS

| 4,203,511 A | 5/1980 | Uhing |
| 4,519,491 A | 5/1985 | Prodel |
| 4,646,245 A | 2/1987 | Prodel |
| | (Continued) | |

FOREIGN PATENT DOCUMENTS

| CN | 102030192 A | 4/2011 |
| CN | 104129651 A | 11/2014 |
| | (Continued) | |

*Primary Examiner* — William R Harp
(74) *Attorney, Agent, or Firm* — Volpe Koenig

(57) ABSTRACT

The transfer device comprises a central structure (20) having at least one transport segment (S21, S22, S23) with drive means (30-1, 30-2, 30-3). The transport segment is intended to receive a carriage (C1, C2, C3) which is mounted so as to be movable with respect to the central structure in a direction of movement. Said carriage has a plate bearing a series of permanent magnets in the direction of movement. The drive means (30) comprise a worm (30-1, 30-2, 30-3) along the transport segment (S21, S22, S23), said worm comprising a ferromagnetic helical perimeter, being mounted so as to be rotatable about an axis parallel to said direction of movement, and being arranged such that the successive turns of the helical perimeter are adjacent to at least some of the permanent magnets of said series.

12 Claims, 16 Drawing Sheets

(56) References Cited

U.S. PATENT DOCUMENTS

| | | | |
|---|---|---|---|
| 4,832,171 A | | 5/1989 | Prodel |
| 5,377,816 A | * | 1/1995 | Deligi ................. H01L 21/6776 |
| | | | 198/619 |
| 5,758,581 A | | 6/1998 | Uhlenbusch |
| 6,082,256 A | * | 7/2000 | Hellmeier .............. B65G 33/04 |
| | | | 101/35 |
| 9,766,258 B2 | * | 9/2017 | Itoh ...................... B65G 35/066 |
| 9,856,096 B2 | | 1/2018 | Hanisch et al. |
| 2009/0321220 A1 | | 12/2009 | Ewerlof |
| 2018/0175717 A1 | | 6/2018 | Foster et al. |

FOREIGN PATENT DOCUMENTS

| | | |
|---|---|---|
| CN | 105899447 A | 8/2016 |
| DE | 19540177 A1 | 4/1997 |
| EP | 0050080 A2 | 4/1982 |
| EP | 0129482 A1 | 12/1984 |
| EP | 0223683 A1 | 5/1987 |
| EP | 2418161 A1 | 2/2012 |
| EP | 2522584 A1 | 11/2012 |
| ES | 2395263 A1 | 2/2013 |
| JP | S57134066 A | 8/1982 |
| JP | H08226512 A | 9/1996 |
| JP | 2012136320 A | 7/2012 |
| KR | 20040043364 A | 5/2004 |

* cited by examiner

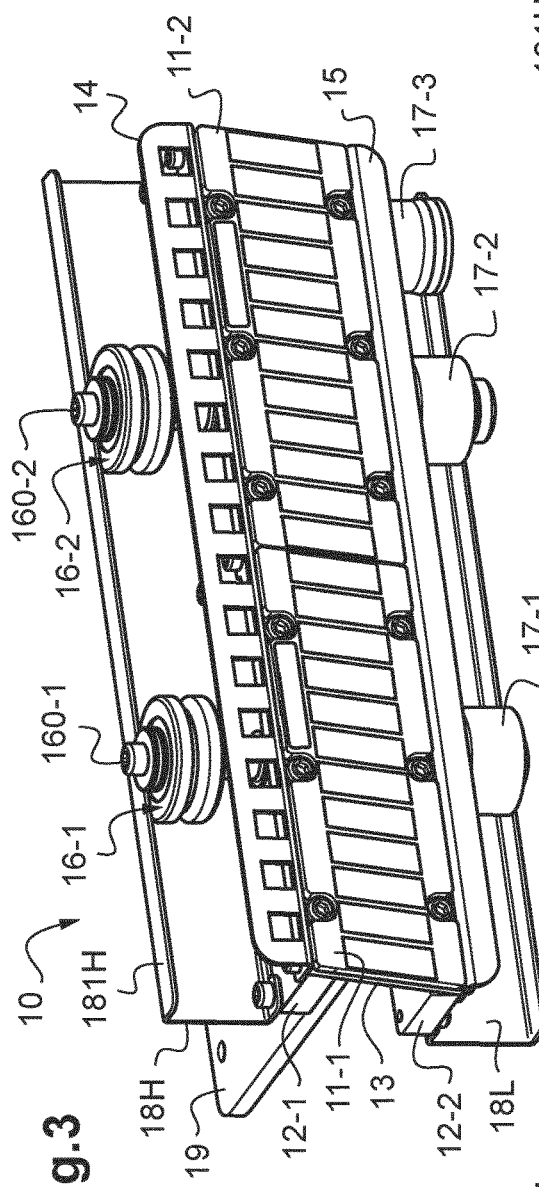
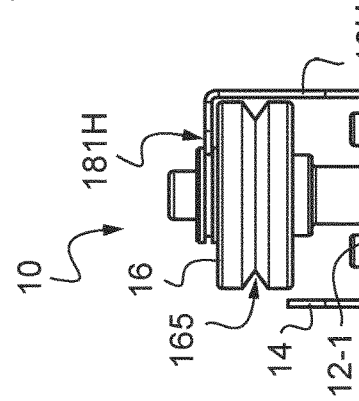
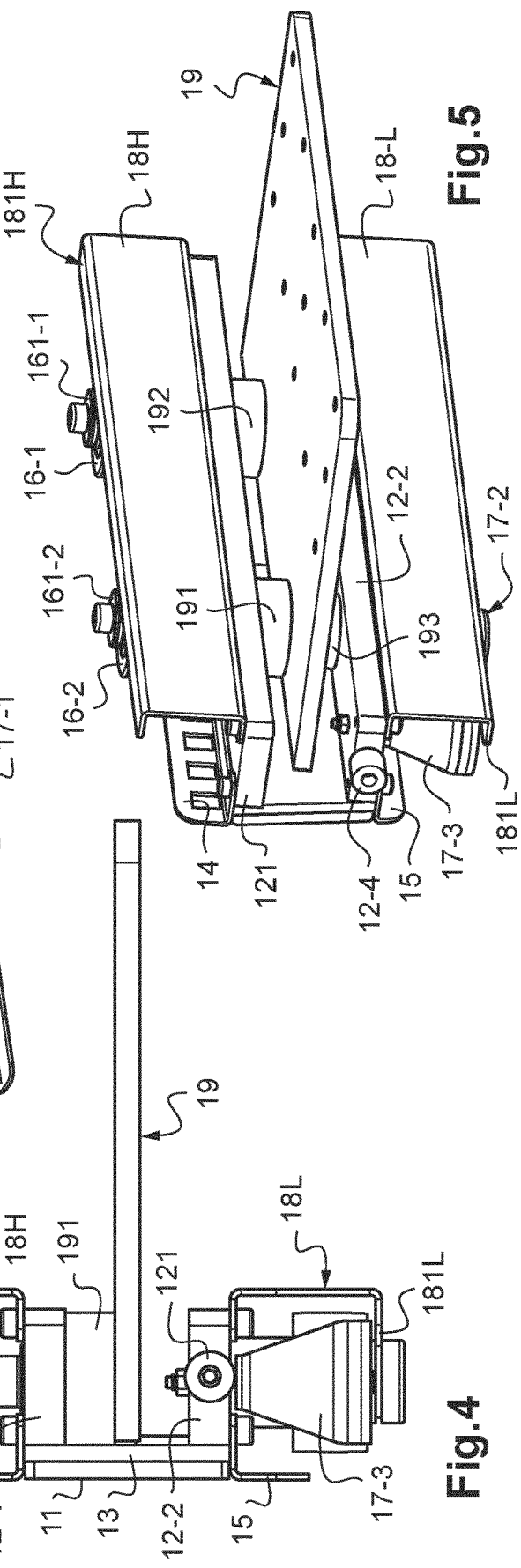

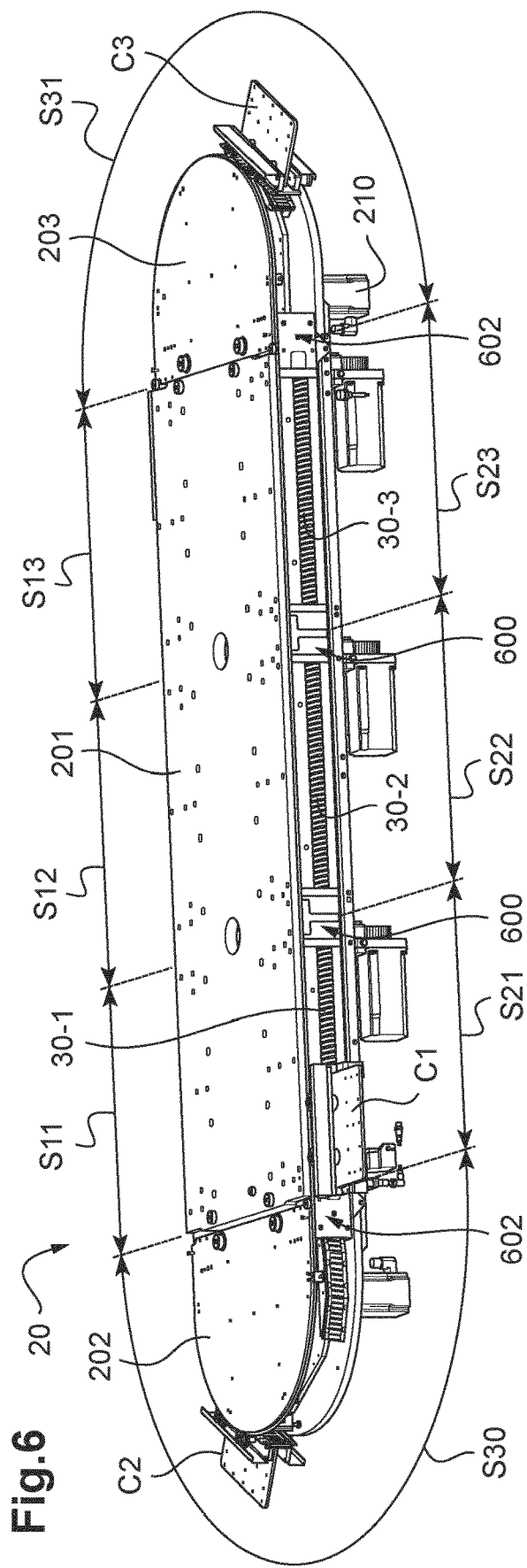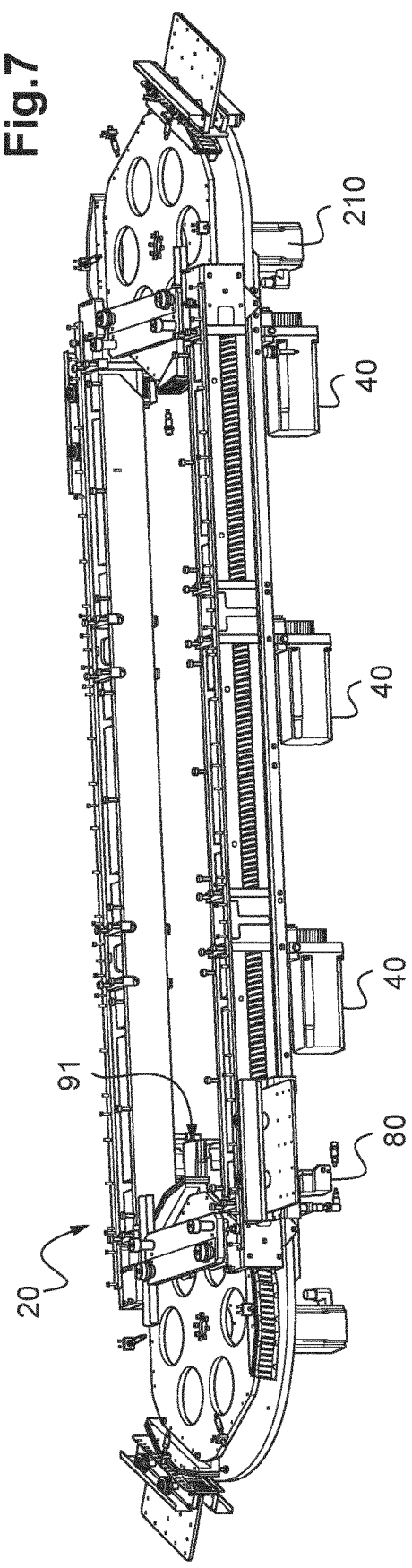

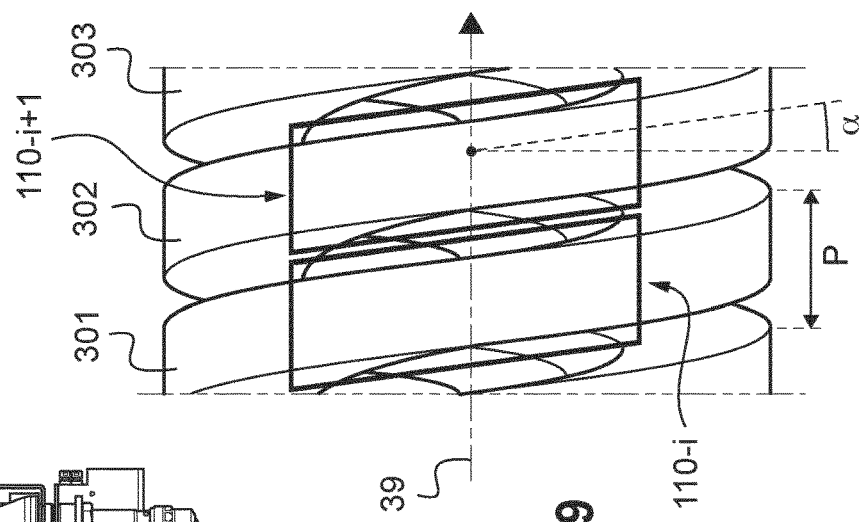
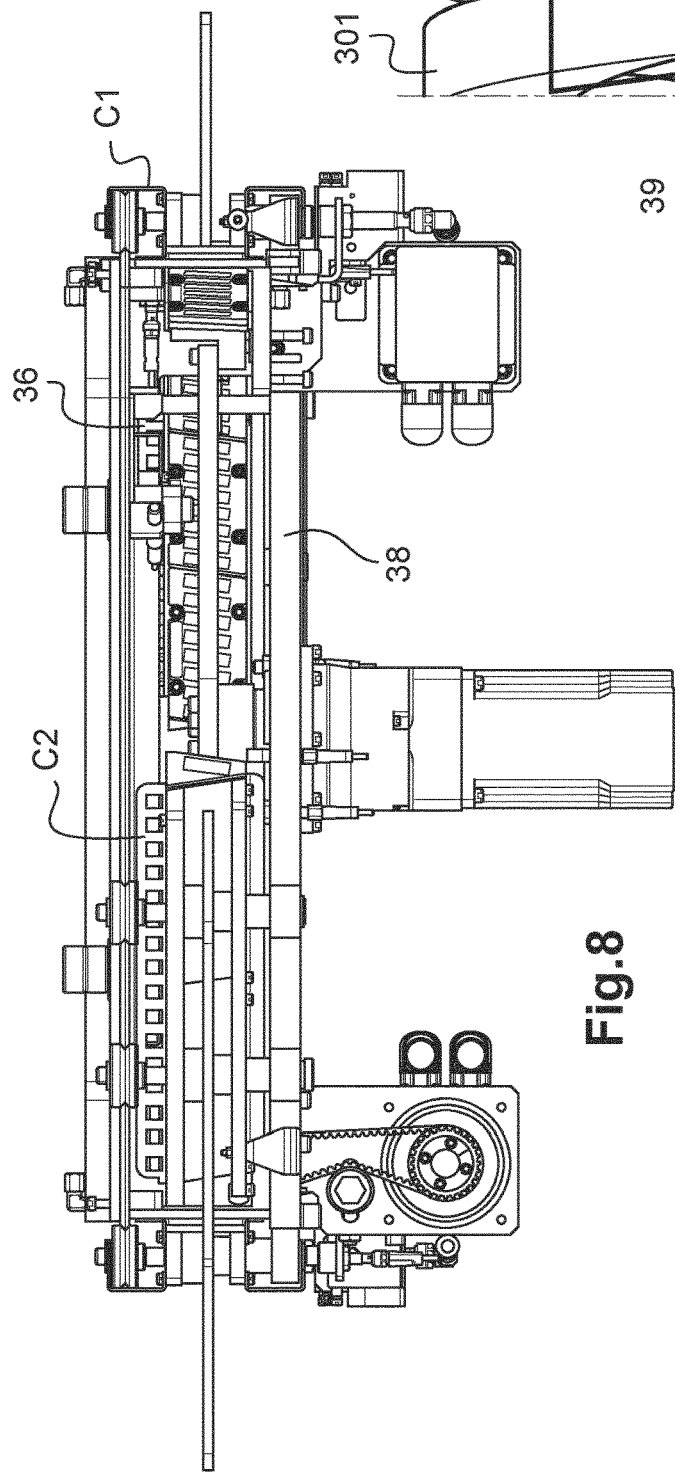
Fig.8
Fig.9

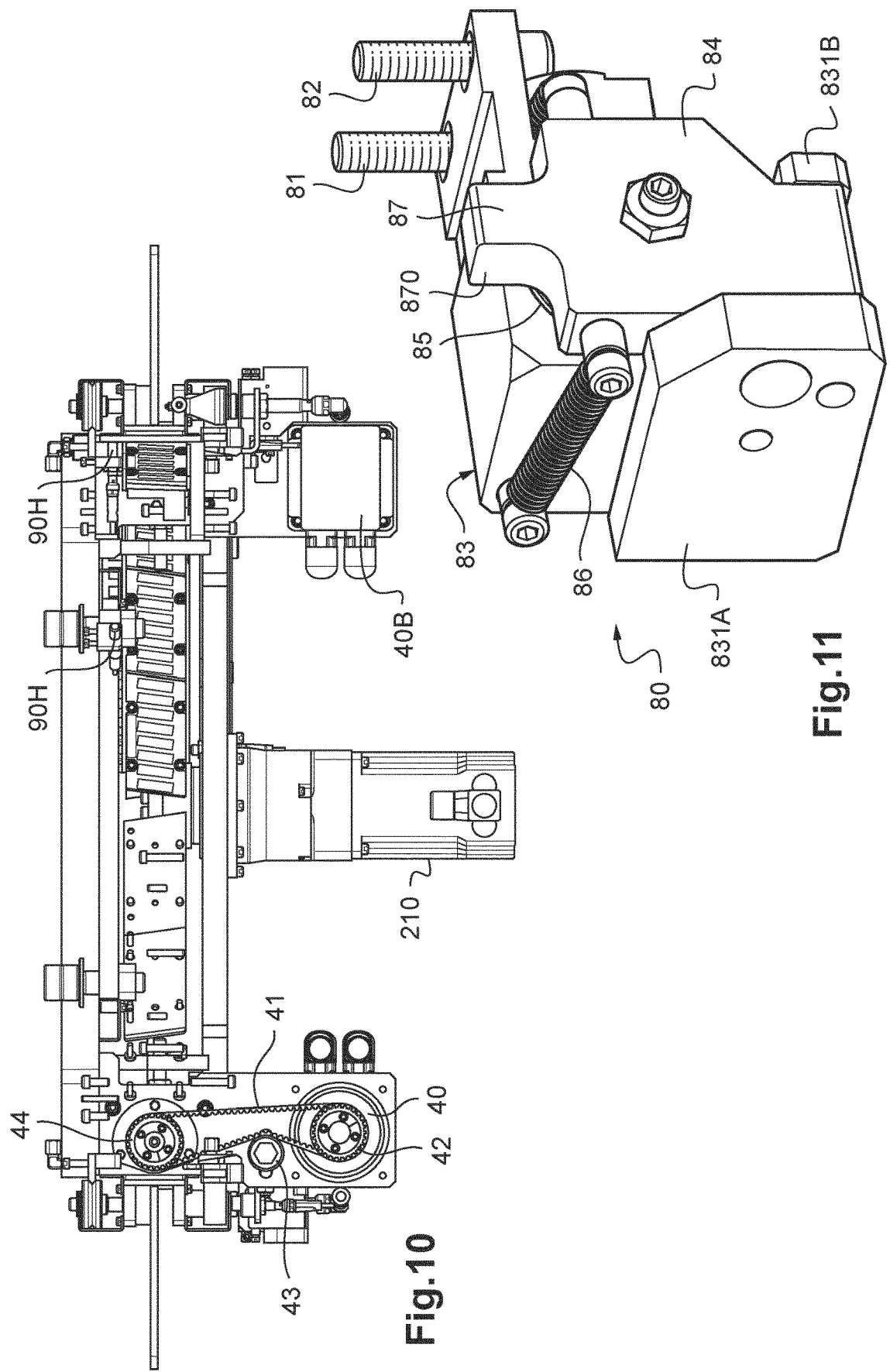

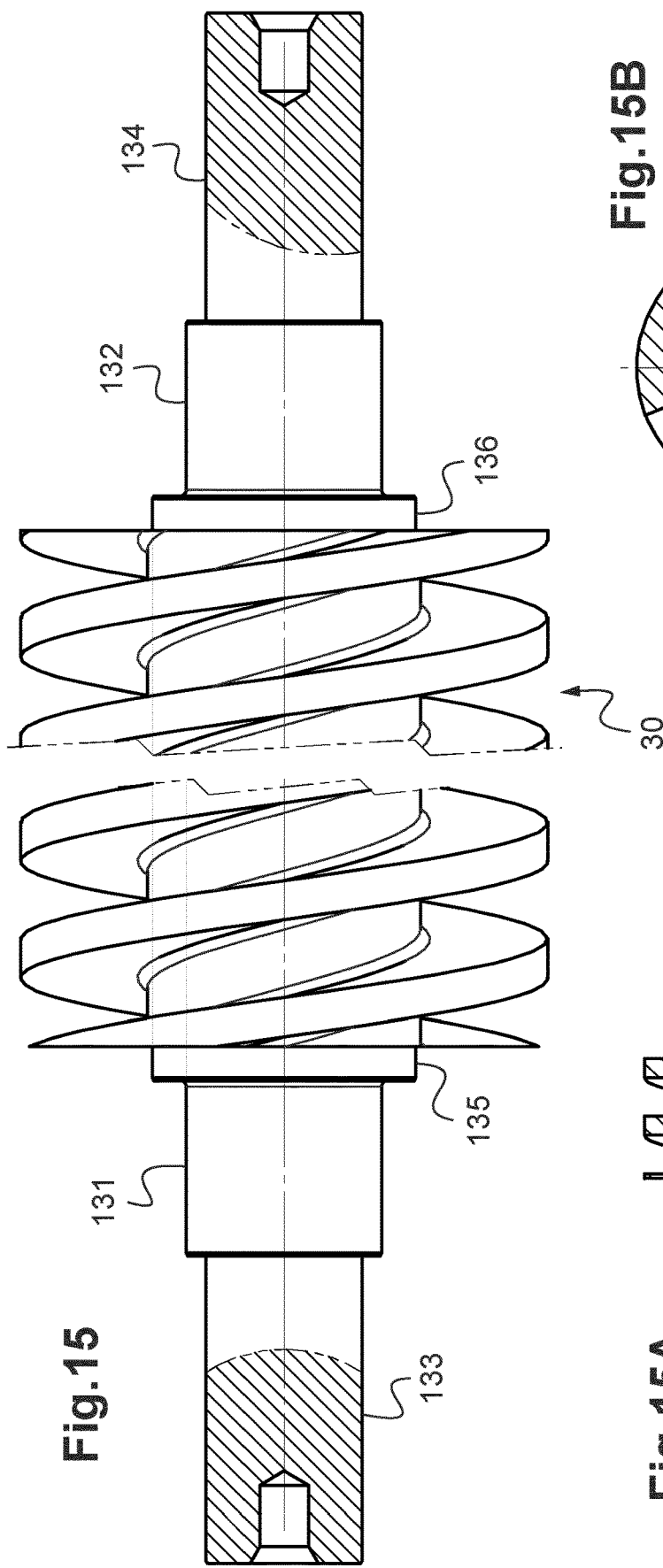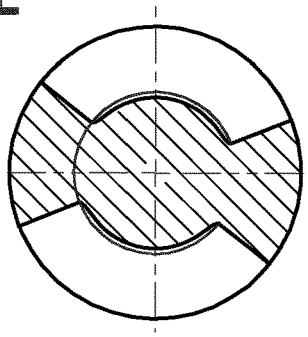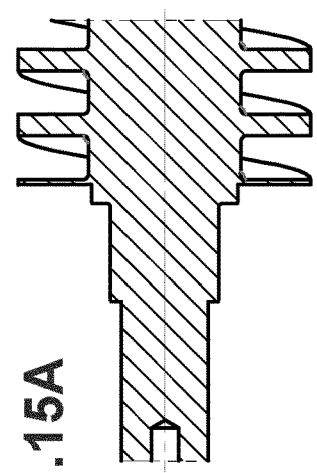

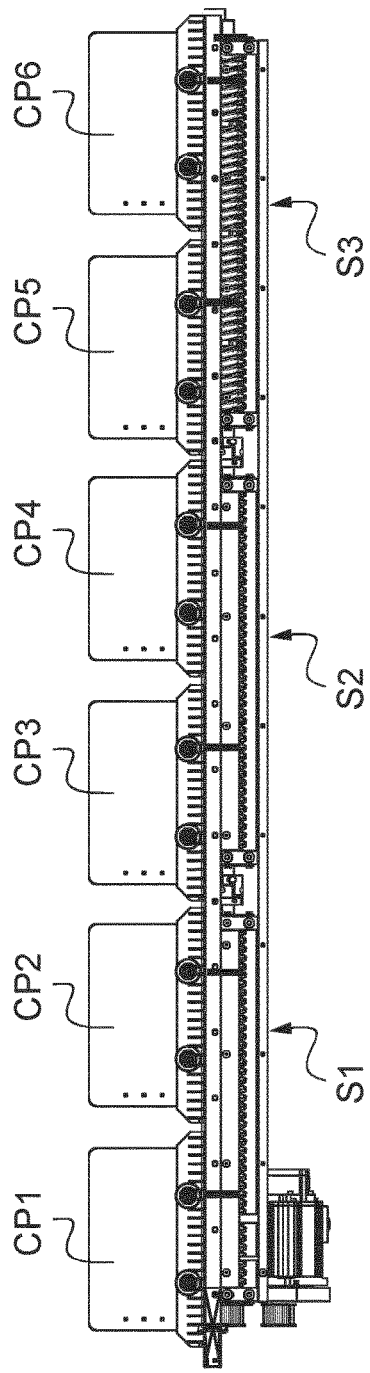
Fig.20
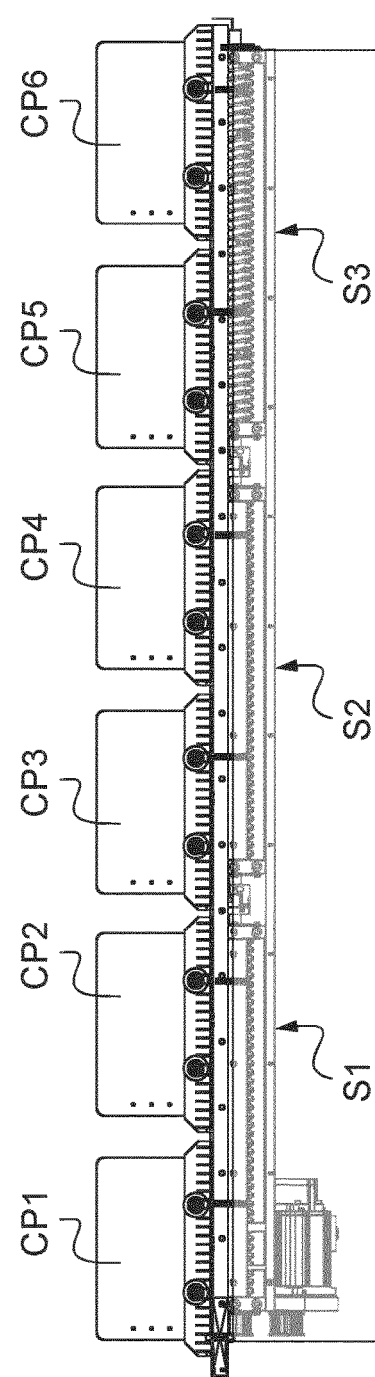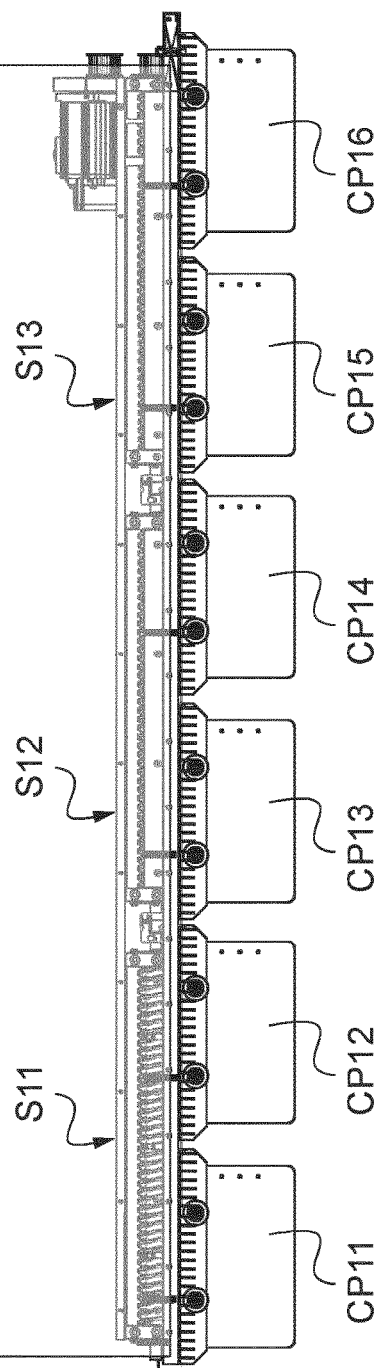
Fig.21

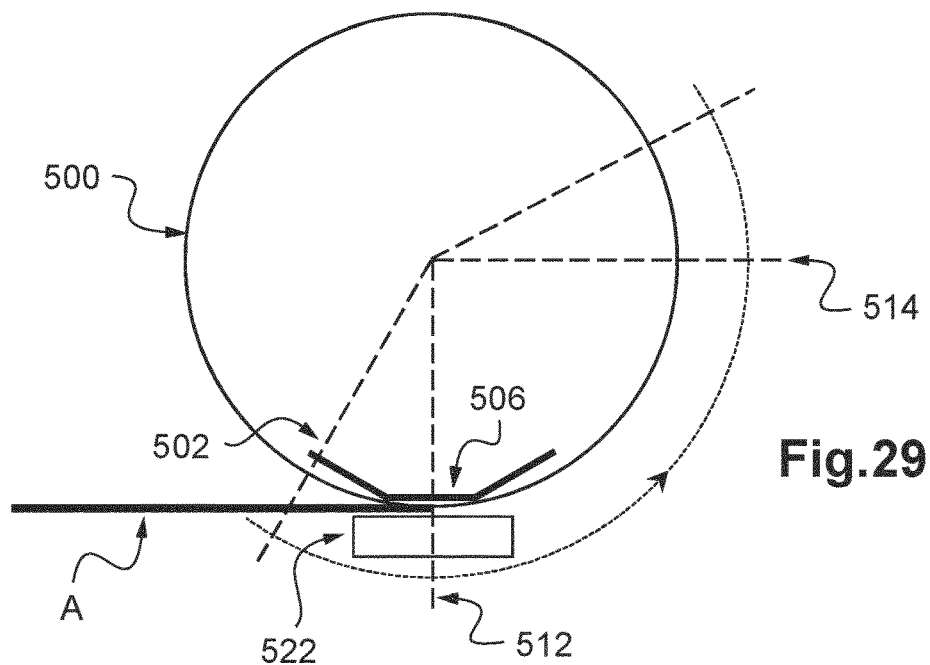
Fig.29
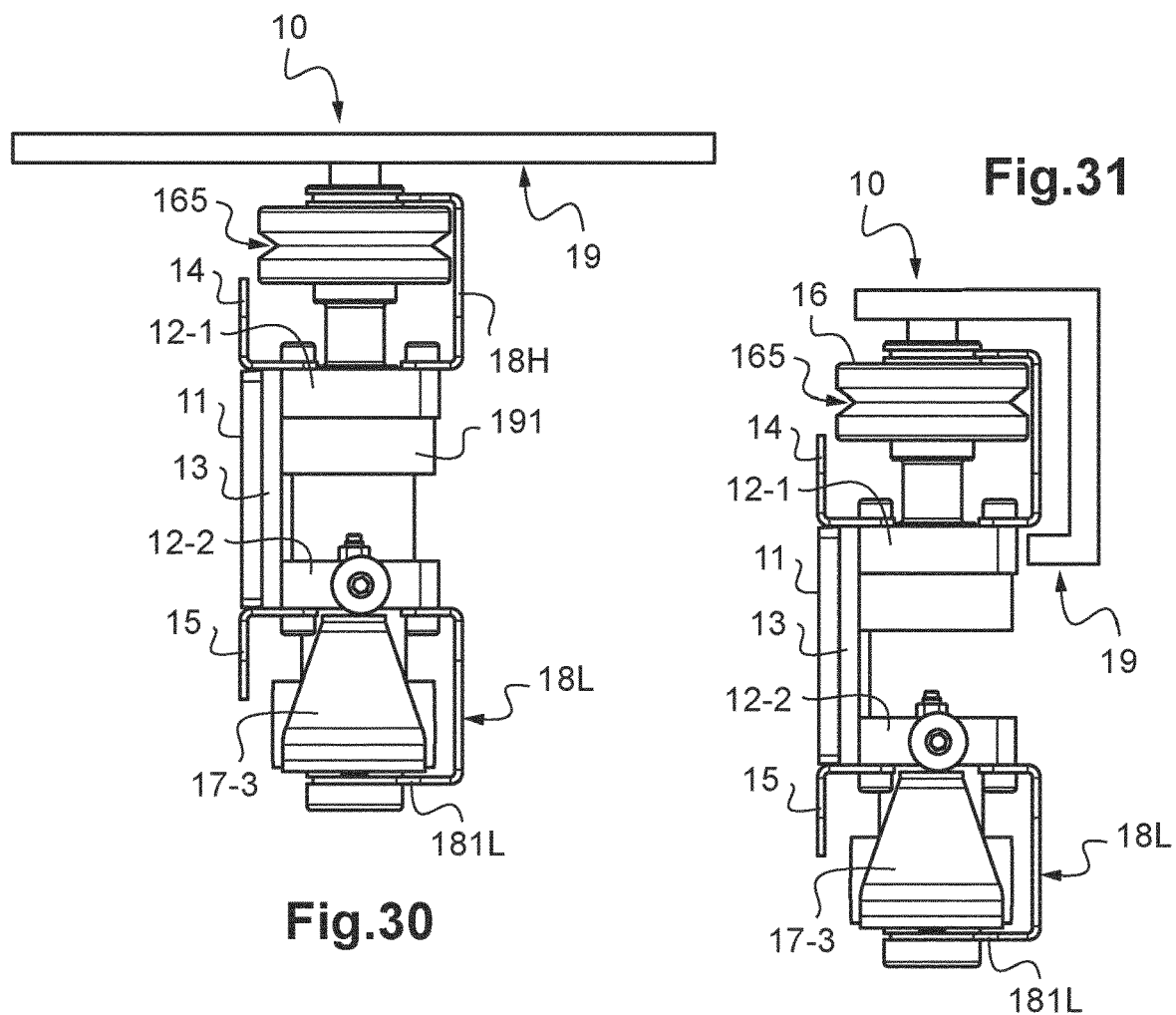

TRANSFER DEVICE

FIELD OF THE INVENTION

The invention relates to a transfer device, for example a device for transferring parts from one location to another.

BACKGROUND

It is particularly but not exclusively applicable to high-precision transfer for depositing a part on an immobilized pallet. Such a transfer device can particular be part of an installation for circulating part-bearing pallets moving in modules by specific drive means, known as flexible factory. Examples have been described in particular in EP0050080, EP0129482, or EP0223683.

The pallets are carriages mounted on casters, which can be self-steerable. The pallets can be driven by friction on belts.

The belt systems can have linear speeds of up to 1 meter per second.

To go faster, linear electric motors are considered. However, they are difficult to control, and their cost is high. Also, guiding the carriages remains a problem. All this makes it difficult to increase the nominal linear movement speed of the carriages, under reasonable economic conditions.

The invention relates to a transfer device which remedies these drawbacks.

SUMMARY

The proposed transfer device comprises a central structure, having at least one transport segment, with drive means, this transport segment being intended to receive one or more carriages, which are movably mounted with respect to the central structure, in a direction of movement, each carriage having a plate bearing a series of permanent magnets in the direction of movement.

The device is characterized in that the drive means comprise a worm, along the transport segment, this worm comprising a ferromagnetic helical perimeter, while being mounted so as to be rotatable about an axis parallel to said direction of movement, and arranged such that the successive turns of the helical perimeter are adjacent to at least some of the permanent magnets of said series, the carriage being held in place on the transport segment by the attraction between the permanent magnets and the worm.

In practice, at least some of the transport segments, preferably all, have worms.

In an embodiment, the central structure comprises a table on two sides whereof two tracks are defined each having at least one transport segment, while at least one end portion is placed at least one of the two ends of the table, to form at least one rotation segment provided with drive means for moving a carriage from one to the other of said tracks.

In this case, the drive means of the rotation segment can be arranged to cooperate with the permanent magnets of the plate of a carriage.

More specifically, the drive means of a rotation segment can comprise a wheel provided with permanent magnet plates homologous with those of a carriage.

Besides that, the worm can have a helix, or several interlaced helices.

The transfer device can furthermore have a stop device, arranged to lock a carriage in a selected position on a transport segment.

In a specific application, the carriage has a part-bearing deck.

According to further features:
- the transport segments are defined on rails;
- the rails are vertical with respect to one another;
- the carriage has at least two rollers intended to be engaged with one of the rails and several wheels intended to bear on the other rail;
- the permanent magnets comprise flat parallelogram-shaped strips;
- the strips are regularly distributed according to a pitch which corresponds to the pitch of the magnetic helical perimeter;
- the strips are arranged according to an inclination of an angle which corresponds to the angle of the magnetic helical perimeter of the worm.

BRIEF DESCRIPTION OF THE DRAWINGS

Further features and advantages of the present invention will emerge on reading the following description of embodiment examples given by way of illustration with reference to the appended figures. In these figures:

FIG. 3 is similar to FIG. 2, but with a slight perspective effect providing a better view of certain parts, FIG. 4 is an end view of the transport carriage, from the right-hand side of FIGS. 2 and 3, FIG. 5 is a perspective view of the transport carriage from the opposite side to that of FIGS. 2 and 3, FIG. 6 is a perspective top view of the transfer device, hereinafter referred to as a conveyor, FIG. 7 is a similar view to FIG. 6, but without the elements of the top deck of the conveyor, FIG. 8 is an end view of the conveyor in FIGS. 6 and 7, FIG. 9 is a diagram showing the interaction between a worm and two strips forming a permanent magnet.

FIG. 10 is an end view of the conveyor, showing certain details better,

FIG. 11 is a perspective view of a stop device suitable for use in the proposed conveyor, FIG. 15 is a side, partially exploded, view of an embodiment of a worm, FIG. 15A is a partial longitudinal sectional view of the worm in FIG. 15, FIG. 15 B is a transverse sectional view of the worm in FIG. 15, FIGS. 16 and 17 are diagrams of two basic or elementary modules, for a conveyor as proposed, FIGS. 20 and 21 are diagrams illustrating two examples of inline conveyors, as proposed.

FIGS. 28 and 29 are schematic views of the loading of a carriage onto the carrousel in FIG. 27.

FIGS. 30 and 31 show alternative embodiments of the carriage in FIG. 4.

DETAILED DESCRIPTION OF THE PREFERRED EMBODIMENTS

The drawings and the description hereinafter contain, essentially, elements of definite nature. Therefore, they may not only serve to give a better understanding of the present invention, but also contribute to the definition thereof, where applicable.

Figure 1:
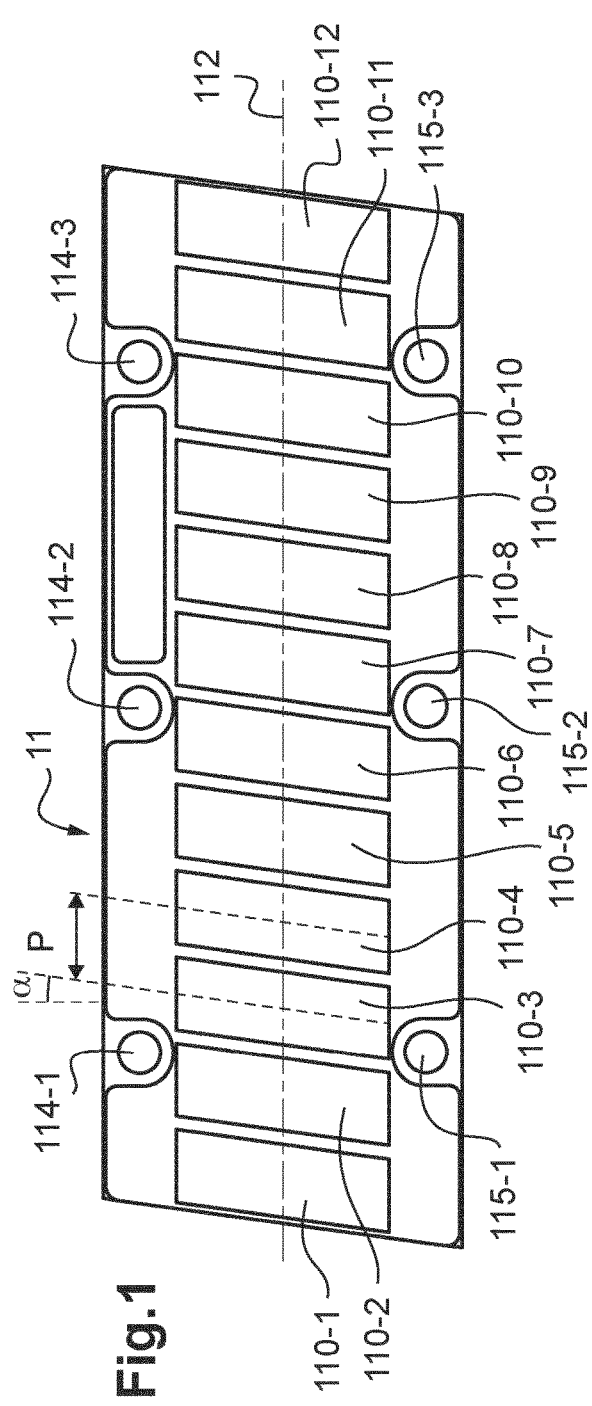
FIG. 1 is a front view of a magnet plate used in a transfer device according to the present invention.
Figure 2:
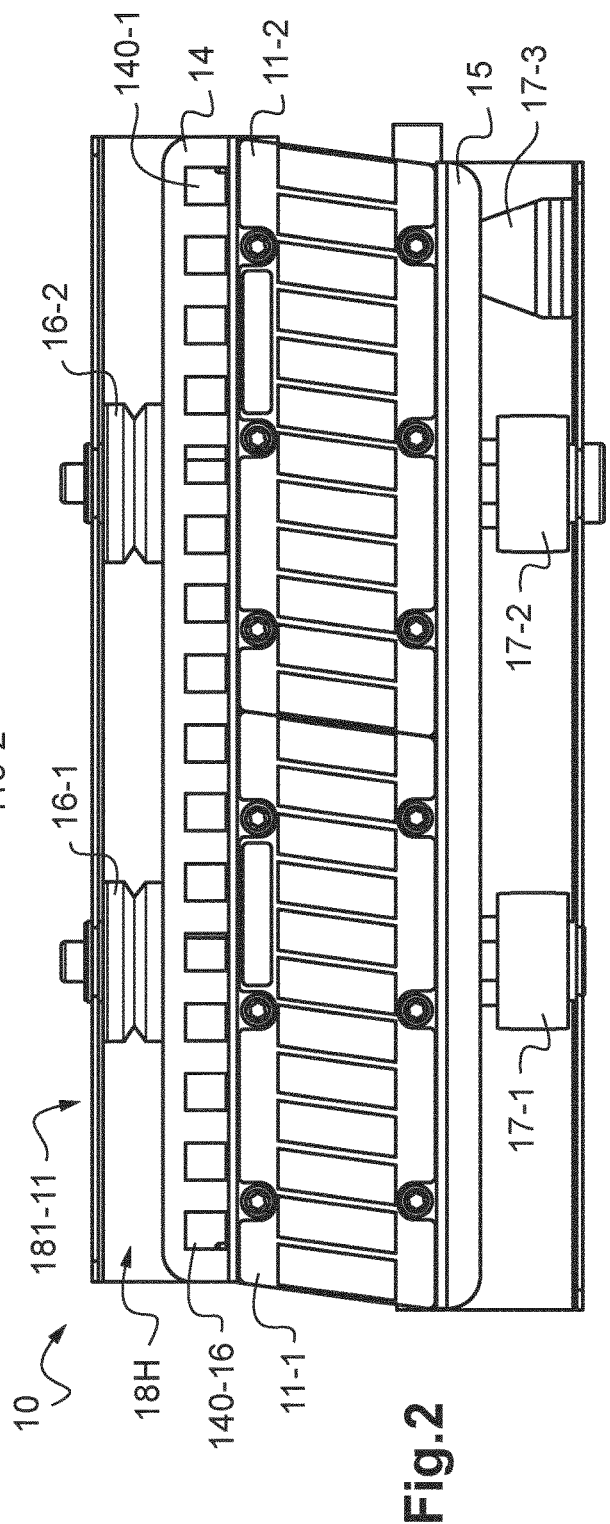
FIG. 2 is a front view of a transport carriage, provided with two magnet plates according to FIG. 1.

FIG. 1 illustrates an elongated plate 11 whereon twelve permanent magnets referenced 110-1 to 110-12 are attached. The permanent magnets are flat parallelogram-shaped strips. In the direction of the longitudinal axis 112 of the plate 11, these strips are regularly distributed according to a pitch p, with an inclination of the greater dimension thereof by an angle α with respect to the transverse axis of the plate, i.e. perpendicular to the longitudinal axis 112 of the plate in the plane of the plate. The plate has six attachment points, 114-1 to 114-3 at the top, and 115-1 to 115-3 at the bottom. Here, the angle between the small sides of the parallelograms and the large sides thereof is 90°+α, or 90°−α, depending on the location where one is positioned. The plate itself also has a parallelogram-shaped outline, with the same angle features. If the spacing between two consecutive edges of two strips along the longitudinal axis 112 of the plate is annotated e, there is a gap e/2 between the edge of the last strip and the edge of the plate, which are parallel with one another. This gap makes it possible advantageously to align plates to increase the number of successive strips.

The pitch can be about 12 mm and the angle of inclination about 8°.

A carriage for transferring parts is now described, with reference to FIGS. 2 to 5.

On a lateral face of the carriage 10, two magnet plates 11-1 and 11-2 are placed, for example as illustrated in FIG. 1.

FIG. 3 shows two longitudinal members 12-1 and 12-2 rigidly connected to an intermediate plate 13, which supports the magnet plates 11-1 and 11-2, in the selected position. Attachment is carried out here with bolts, fitted in the orifices 114-1 to 114-3 and 115-1 to 115-3 of FIG. 1, and screwing into the longitudinal members. The magnet plates 11-1 and 11-2 are placed end to end, to form a periodic series of twenty-four, in principle equidistant, magnetized strips, including at the junction between the plates 11-1 and 11-2, and extending along the longitudinal members 12-1 and 12-2.

Below the two plates 11-1 and 11-2, a downward-facing covering 15 is provided. Above the two plates 11-1 and 11-2, a further upward-facing covering 14, of greater height than the covering 15, is provided. The covering 14 has a series of sixteen perforations 140-1 to 140-16 regularly distributed in the direction of the longitudinal members. These perforations have a selected shape, here rectangular.

The carriage further has in the upper part a vertical trim 18H, attached to the longitudinal member 12-1. The trim ends with a turned edge 181H, which has here a rectilinear free face. Two rollers 16-1 and 16-2 can be seen, mounted running on axes 160-1 and 160-2 attached in the longitudinal member 12-1. The rollers 16-1 and 16-2 have at the outer periphery a V-shaped groove, described hereinafter. They are located behind the trim 18H. The rollers 16-1 and 16-2 are topped with washers 161-1 and 161-2. These washers have at the outer periphery a U-shaped groove, which bears on the free face of the turned edge 181H. This support is carried out without a rolling bearing.

The carriage has in the lower part a further vertical trim 18L, attached to the longitudinal member 12-2. The trim ends at the bottom with a horizontal turned edge 181L, which has here a rectilinear free face. Two washers 17-1 and 17-2, as well as a conical block 17-3, flaring downwards, can be seen below. They are all located behind the trim 17H. Under the washer 17-2, a smaller washer 171-2 is located. This washer 171-2 has on the outer periphery a U-shaped groove, which bears, without a rolling bearing, on the free face of the turned edge 181L. Under the wheel 17-1, the head of an attachment screw is seen.

A part-bearing deck 19 is attached onto columns 191 to 194, in turn mounted on the longitudinal members 12-1 and 12-2. The deck 19 projects horizontally outwards from the carriage, on the opposite side thereof to the magnet plates 11-1 and 11-2. In a further configuration, the part-bearing deck can also be attached above the carriage, in the central position, below 160-1 and 160-2.

The trims 18H and 18L also have a spatter protection function, for example in respect of lubricants, on the user's product(s), borne on the deck 19. The transfer device or conveyor is now considered as a whole, with reference to FIGS. 6 to 8.

In FIG. 6, the conveyor is provided with a top table, which is here in three parts: a central part 201, of general rectangular shape, and two slightly lower end parts 202 and 203, in the shape of a circular semioval.

The central part is divided into three segments, such as S11, S12 and S13 at the rear, and S21, S22, and S23 at the front. In each segment, flush on the side, a worm is provided, such as 30-1, 30-2 and 30-3 for the segments S21, S22, and S23.

Carriages can be seen in C1, C2 and C3, in particular. When the carriage CI is engaged on the guides thereof, the magnet plates of this carriage C1 are flush with the worm 30-1. This results in a force of attraction between the carriage and the worm. In the example described herein, the rails 36 and 38 are vertical in relation to one another. The size of the central structure is thereby reduced, with respect to rails in the same plane.

FIG. 8 provides a better view of how the carriages are suspended. In this figure, the trims 18H and 18L are removed, to show the rollers 16 and 17 better.

At the top, the triangular cross-sectional groove 165 of the roller 16 of the carriage C1 engages on a rail 36, which goes all around the conveyor 20. The rail 36 has a triangular head in cross-section, homologous to the triangular shape of the groove.

At the bottom, the wheels 17 roll on a rail or a flat track 38, which, also, goes all around the conveyor 20.

The carriage is kept bearing on the rails 36 and 38, by the force of attraction exerted between the magnets and the worms 30, independently of any external power source.

FIG. 9 shows 3 turns 301 to 303 of the worm 30, as well as two adjacent magnetized strips 110-i and 110-(i+1), where i is an integer.

The turns 301 to 303 are helical windings of rectangular cross-section. The material forming the turns can be made of steel. At least on the periphery, the windings are ferromagnetic.

The pitch p between two adjacent turns of the worm can be 12 mm. The angle of inclination a of a turn with respect to a radial plane can be 8°. The pitch between two magnetized strips 110-i and 110-i+1 is then also 12 mm. And the angle of inclination of the longitudinal axes of the two magnetized strips is also 8°.

The axis of the turns is annotated 39. When the carriage is in position on the rails 36 and 38, the two strips 110-i and 110-i+1 are facing the turns 301 and 302. The two strips 110-i and 110-i+1 have a substantially identical inclination (or orientation) to the helix angle of the worm. The centers of the two strips 301 to 303 are substantially at the same height as the axis of the worm (in this figure). Each strip symmetrically overlaps the turn facing it, in the horizontal direction. Furthermore, the two strips have the same magnetic polarity, for example North pole on the left and South pole on the right. Thus, the magnetic field of a strip is closed in the turn facing it, the turn tending to be centered on the magnet. This creates a force of attraction, which tends to keep each strip substantially centered on the turn facing it. This effect is multiplied by the number of magnetic strips and turns facing one another.

The greater the inclination between the strips and the more similar the turns are, the better the efficiency. The efficiency is thus maximum when the turns and the strips have the same inclination. In further alternative embodiments, the strips and the turns can have a slightly different inclination. This tolerance in the inclination makes it possible advantageously to reuse a carriage 10 or a frame in another installation with a slightly different inclination without having to replace the worm 30 or the plates 11.

Figure 14:
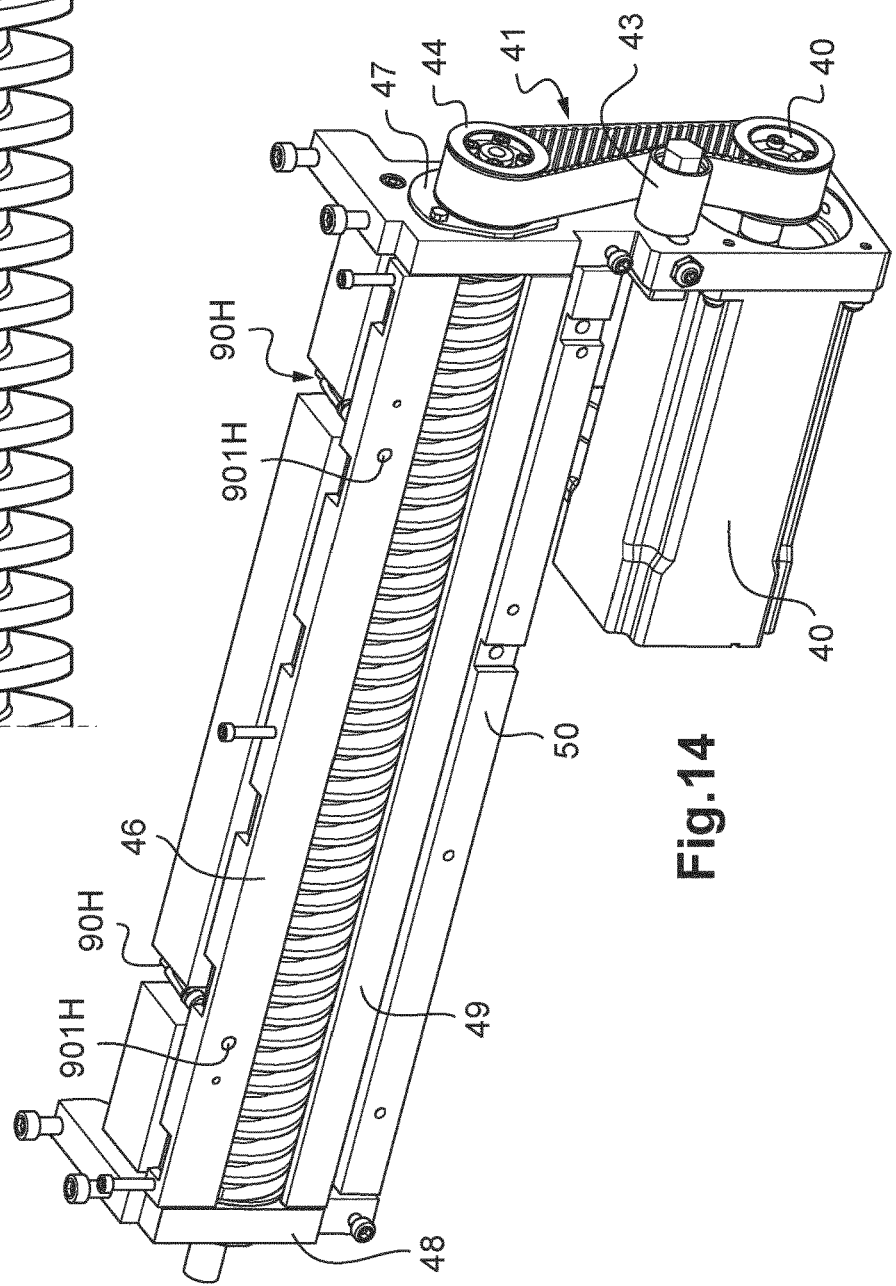
FIG. 14 is a perspective view of worm drive for a segment of the conveyor.

FIG. 10 is a similar view to FIG. 8, but with parts removed to provide a better view of the drive of a worm 30 by an electric motor 40. The drive device alone is shown in FIG. 14.

A synchronous belt 41 is fitted on the pulley 42 of the motor 40, then on a tensioner 43, and finally reaches a synchronous pulley 44 rigidly connected to the worm. A further motor 40B can be seen in FIG. 10.

The worm is borne by bearings 47 and 48, which define the axis of rotation thereof in the conveyor 20. It is flush in the interval defined between an upper guide strip 46 and a lower guide strip 49, below which a further guide strip 50 is located (FIG. 14).

At the rear, inductive or optical sensors 90 H are provided, which traverse the guide strip 46, such that the sensitive end 901 H thereof faces the perforations of the covering 14. The guide strip 50 can also be provided with through optical sensors.

The whole drive device is borne by a beam 51.

When the worm is rotated, this results in an attractive magnetic force which tends to move the strips, with the carriage which is rigidly connected thereto, so that they follow the movement of the worm. The movement of the strips is horizontal, in view of the guidance thereof by the rails 36 and 38, which holds the strips facing the turns of the worm.

It is possible to have a motor for each worm, or the same motor for several worms, which are then interconnected by couplers (not shown).

Precise positioning of each carriage 10, which moves with the rotation of the worm that it is facing, is thus obtained.

The purpose of the movement is to move a carriage 10 from one to the other of the three segments S1, S2 and S3, on each side of the conveyor (FIG. 6). In each segment, it can consist of performing a task on a part attached to the part-bearing deck 19 of the carriage, using a tool mounted on the top table 201 of the conveyor (FIG. 6).

Very precise relative positioning may be required. It can be obtained with the stop device illustrated in FIG. 11. This device 80 can be attached by two screws 81 and 82 under the conveyor 20, for example in the position illustrated in FIG. 7. It has a body 83 provided with a pivot-holder 831 whereon a flap 84 is hinged. Behind this flap, an electromagnet 85 is provided, which can lock the flap 84 in the vertical position. The flap has an upper projection 87, provided with a face 870 which is inserted in front of the stop 121 of the carriage (FIG. 4), when the electromagnet 85 is excited to lock the flap 84 in the vertical position. This stops the carriage in a selected position, which can be a working position. If the electromagnet is not excited, and the worm rotates, the carriage continues the travel thereof, while the flap 84 tilts, then returns to its position due to the elastic return 86.

The movements of the carriages are tracked by the optical sensors 90 H. Each sensor 90 H counts the perforations 140 that pass when the carriage moves in front of it, where needed with interpolation if the perforation passage times are observed. This forms a movement indication, and can form a position measurement, if the carriage starts from a known initial position.

Similar sensors (not shown) detect the end edges of the covering 15 located at the bottom of the carriage. This makes it possible to ascertain whether and where a carriage is present.

The conical block 17-3 of each carriage comprises an RFID memory. Under the conveyor, devices to read/write or merely read in this RFID memory are provided, for example in 91 (FIG. 7). This makes it possible to give the carriage an identifier, and to then track the path of this carriage, while saving the processing operations that the part borne has undergone.

FIGS. 6 and 7 show carrousels in both free ends of the conveyor. This consists of a non-limiting means for moving the carriage from one side of the conveyor to the other, and therefore use both sides thereof.

Figure 12:
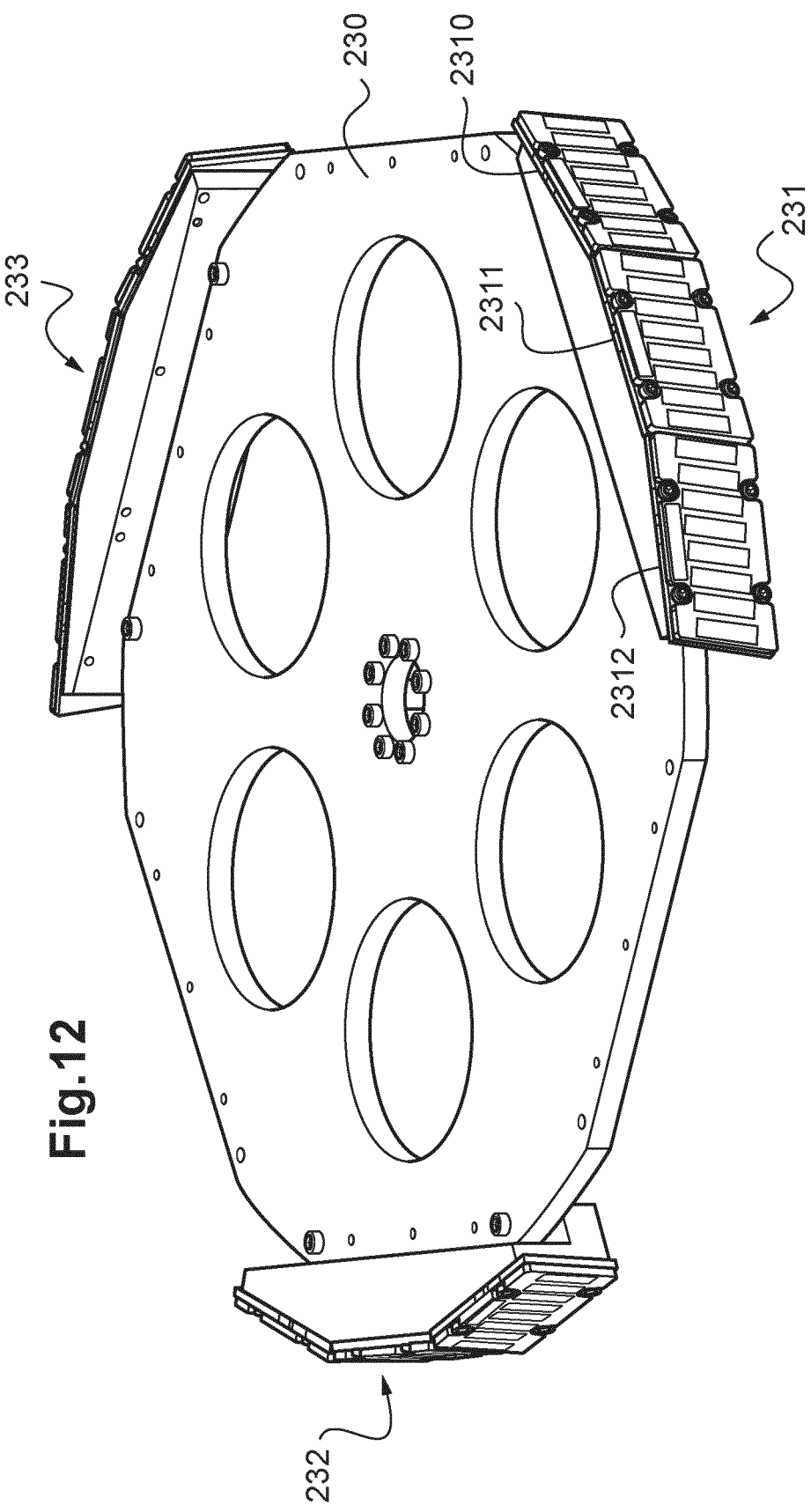
FIG. 12 is a perspective view of a carrousel that can be fitted at the end of the conveyor to move a carriage from one side of the conveyor to the other.

FIG. 12 illustrates such a carrousel in more detail. It starts with a plate 230 with a hexagonal contour. On three non-adjacent sides of the hexagon, three mountings 231, 232 and 233 are mounted. There can be 1 to 6 mountings of this type. Alternatively, the plate 200 can be of a polygonal shape other than a hexagon, in particular another regular polygon, and the mountings can be between 1 and the number of sides of the plate 200.

Each mounting has two outer faces such as 2310, 2311 and 2312 for the mounting 231. And each face receives a magnet plate according to FIG. 1. The three mountings thus define three segments of a polygonal contour with 18 sides.

The inclination of the magnets borne by the faces 2310, 2311 and 2312 is mirror-symmetrical with that illustrated in FIG. 1.

The plate 200 is lightened by perforations and is attached at the center thereof on the shaft of the motor 210 seen in FIGS. 6, 7 and 10.

When a carriage 10 reaches the end of the rectilinear trajectory thereof on one side of the conveyor, the magnet plate thereof close to the end overhangs towards the carrousel in question. It then cooperates with the first magnet plate of one of the mountings of the carrousel. The carrousel then takes over from the worm to start running the carriage, by holding it by magnetic attraction on the guide rails 36 and 38, which also exist on the carrousel, suitably curved, substantially in a semicircle. One after the other, the two other magnet plates of the carrousel do the same, such that the carriage now follows the carrousel to move from the other side of the conveyor, where it reaches the first worm through a reverse process of that described above.

All of this is synchronized by a device which controls the motors of the worms, and the motors 210 of the carrousels, as well as the software powering this control device.

Thus (FIG. 6), a closed circuit is formed by the segments S21, S22, and S23, the end rotation zone S30, the segments S11, S12, and S13, as well as the end rotation zone S31.

A carriage can start for example from the position C1 in FIG. 6. A controlled rotation of the worm 30-1 can then convey it to any position selected on the segment S21, for example facing a workstation (not shown) located substantially at the midpoint of the segment S21. The product borne by the carriage then undergoes an operation, for example adding a part. Another controlled rotation of the worm 30-1 can then convey it to the end of the segment S21, where the carriage is handled by the worm 30-2. A controlled rotation of this screw can convey this carriage to any position selected on the segment S22, for example facing a workstation (not shown) located substantially at the midpoint of the segment S22. The product borne by the carriage then undergoes a second operation, for example adding another part. This process continues on the segment S23, where the product borne by the carriage undergoes a third operation. After this, the carriage passes through the end rotation zone S31, for example as seen in C3, to reach the segment S13 at the rear part of the conveyor.

The rear segments S21, S22, and S23 can be provided with individual motors for the worms thereof, such as the front segments S11, S12, and S13. It is then possible to continue to complete the product borne by a carriage to each segment, provided with a workstation. The carriage can then follow the end rotation zone S30, to reach the segments S11, S12, and S13, where it undergoes further operations, the workstations being programmed differently, and so on.

Alternatively, the rear segments S21, S22, and S23 can form a single return track, in which case a single drive motor can be provided for the worms, interconnected by couplers.

A workstation can have a tool of any suitable type, such as for example a gripping, measuring, testing, screwing tool, etc.

Further conveyor configurations that can be envisaged will be described hereinafter.

Figure 13:
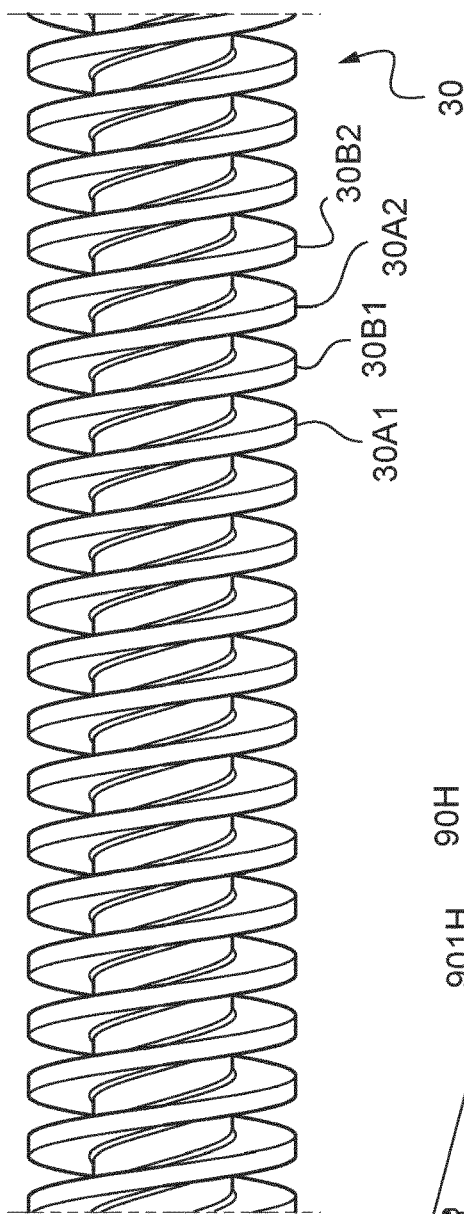
FIG. 13 is a perspective view of a worm used in the proposed conveyor.

FIG. 13 illustrates a part of one of the worms 30. In this embodiment, the worm comprises two interlaced helices, symmetrical with respect to a plane perpendicular to the axis thereof, each having a double pitch of p. A first helix is seen, wherein a turn 30A1 is continued on the next revolution by a turn 30A2, interlaced with a second helix, wherein a turn 30BI is continued on the next revolution with a turn 30B2. The helices are made of a rigid, ferromagnetic material or coated with a ferromagnetic material.

Alternatively, a single helix of pitch p can be used. The double helix enables the same result with half the rotational speed of that of the worm with a single helix of pitch p, which reduces wear and noise. A triple helix can further be used.

In a specific embodiment:

The magnetized plate of la FIG. 1 is the model supplied by the company TECNOTION, Almelo, Netherlands, under the reference TM 144.

The worms have a profile defined according to FIG. 15, described hereinafter.

The drive motors of the worms can be AM8000 series servomotors from the company Beckhoff, for example the model AM8043, with a resolver-encoder The drive motor of each end carrousel can be an AM8000 series servomotor from the company Beckhoff, for example the model AM8041, with a resolver-encoder The company Beckoff also supplies software for controlling its equipment, such as for example Twincat 3. In the use described herein, control can be carried out using this software as working tools ("libraries") and supplementing them, particularly with modules arranged to synchronize the motors of the worms, and of the carrousels.

In an embodiment (FIGS. 15, 15A and 15B), a worm 30 is accompanied on either side by bearing axes 131 and 132, followed by drive flanges 133 and 134. Each axis 131 or 132 receives the ball bearing 47 or 48 cited above. Each flange 133 or 134 receives the synchronous pulley 44 cited above, rigidly connected to the worm.

The helix of the worm 30 ends at each end with a clean cut in cross-section, slightly before the shoulders 135 and 136 preceding the bearings 131 and 132.

FIGS. 15A and 15B confirm that the worm has two helices, each with a pitch of 24 mm, mounted on a central cylinder of diameter 28 mm. The thickness of a turn of the helix is 4 mm, and the outer diameter thereof is 54 mm.

The total length of the helices is 488 mm, which corresponds to 20.33 pitches for each of the two helices.

The part of FIG. 15 can be manufactured by turning or using a machining center. The material can be XC38 ferromagnetic steel, with phosphating surface treatment.

The magnetized plate of FIG. 1 can also be part of a linear motor, for example the coil units sold by the company TECNOTION under one or more of the references TM3, TM6, TM12 and TM18.

Thus, a worm conveyer can be used adjacent to a coil conveyor, and a carriage transferred to one of the conveyors to the other.

It would also be possible, in the same conveyor, to use worms for some of the segments of the conveyor, and coil units for the others. Here again, the control can be carried out using Beckhoff software, for example: TWINCAT 3. In the simplest version, the front segments S11, S12, and S13 have worms, and the rear segments S21, S22, and S23 are provided with coil units to form a linear motor.

At least one of the carrousels S31 and S32 can also be based on a linear motor.

The alternative embodiments with a linear motor above are of particular interest in the case of re-fitting an existing installation with linear motors, the worm segments being compatible, without requiring modification of the magnetized plate carriage, and facilitating movement control.

Indeed, the worm drive is particularly advantageous.

Firstly, it is tolerant of positioning errors or deviations. It accepts for example that the carriage is immobilized by the device in FIG. 11, or any other obstacle that would present itself on the path of the carriage, even if the worm continues to rotate a little.

On the other hand, a linear motor must be controlled precisely to define the stopping position of the carriage, and an immobilization of the carriage while the linear motor is actuated would be poorly tolerated.

The conveyor assembly in FIGS. 6 and 7 can be mounted on a rigid, fixed and floor-mounted frame, with adjustable legs, which holds the deck substantially at eye level. The rigid frame can be embodied at least partially as described in FR 2817183.

Different conveyor structures will now be described. Hereinafter, a carriage position is denoted by a reference in the format CPi, where i is an integer. The same reference, in different figures, does not denote the same carriage position. And the carriage positions are not necessarily all occupied by a carriage.

Figure 16:
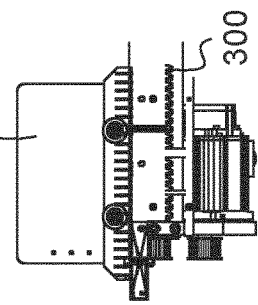

FIG. 16 illustrates a carriage position CP1, which is the elementary modules of the conveyor, wherein a worm length 300 is housed. The overall length of this elementary module (the pitch thereof) is 312 mm.

Figure 17:
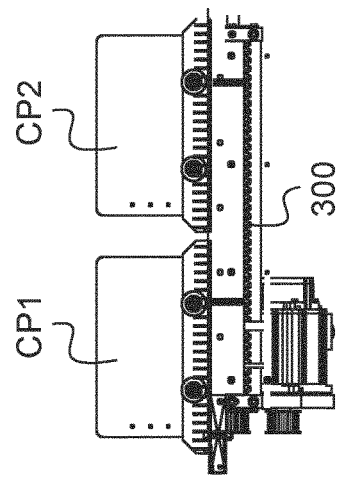

FIG. 17 illustrates two carriage positions CP1 and CP2, which extend along a worm length 300. Each of the above-mentioned segments S11 to S13 and S21 to S23 corresponds to this FIG. 17. This basic module is referred to as "economical", as it uses one worm for two carriages. The overall pitch of this module is 624 mm.

Figure 18:
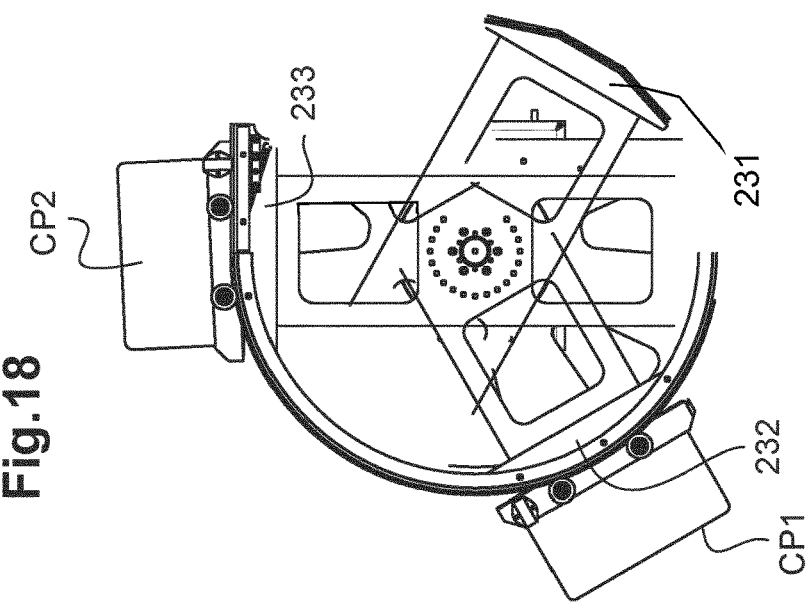

An end carrousel comprises at least one rotary arm 231. Typically (FIG. 18), it can comprise three 231 to 233, with two carriage positions CP1 and CP2.

Figure 19:
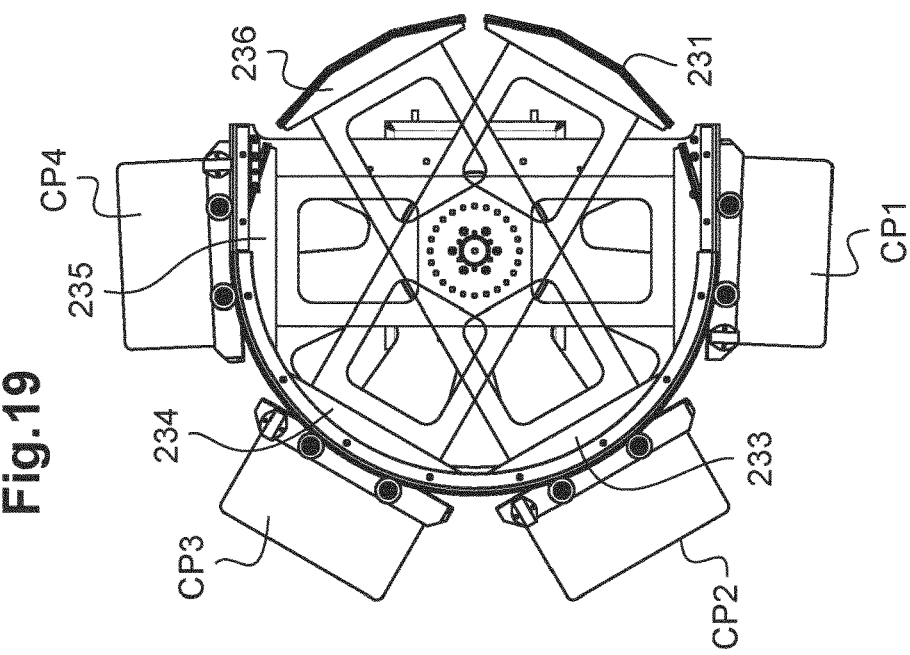
FIGS. 18 and 19 are diagrams illustrating two alternative embodiments of the carrousels suitable for use in a conveyor.

As shown in FIG. 19, it is possible to have more rotary arms, for example 6, referenced 231 to 236, with four carriage positions CP1 to CP4.

The geometry of the conveyor can also vary.

FIG. 20 shows an inline conveyor, with 6 carriage positions CP1 to CP6, on three worm segments SI to S3. This inline conveyor is referred to herein as a "longitudinal member".

FIG. 21 shows in the top part the same longitudinal member as FIG. 20, and in the bottom part a symmetrical longitudinal member, with 6 carriage positions CP11 to CP16, on three worm segments S11 to S13.

According to the specific embodiment, the 3 segments of a longitudinal member form an overall pitch of 3 times 624=1872 mm.

In the presence of several adjacent conveyors, a transfer workstation can be used, to move the part from a carriage located on a conveyor to a carriage located on the next conveyor. Alternatively, the carriages being detachable, the carriage could be transferred at the same time as the part borne thereby, from one conveyor to another.

Figure 22:
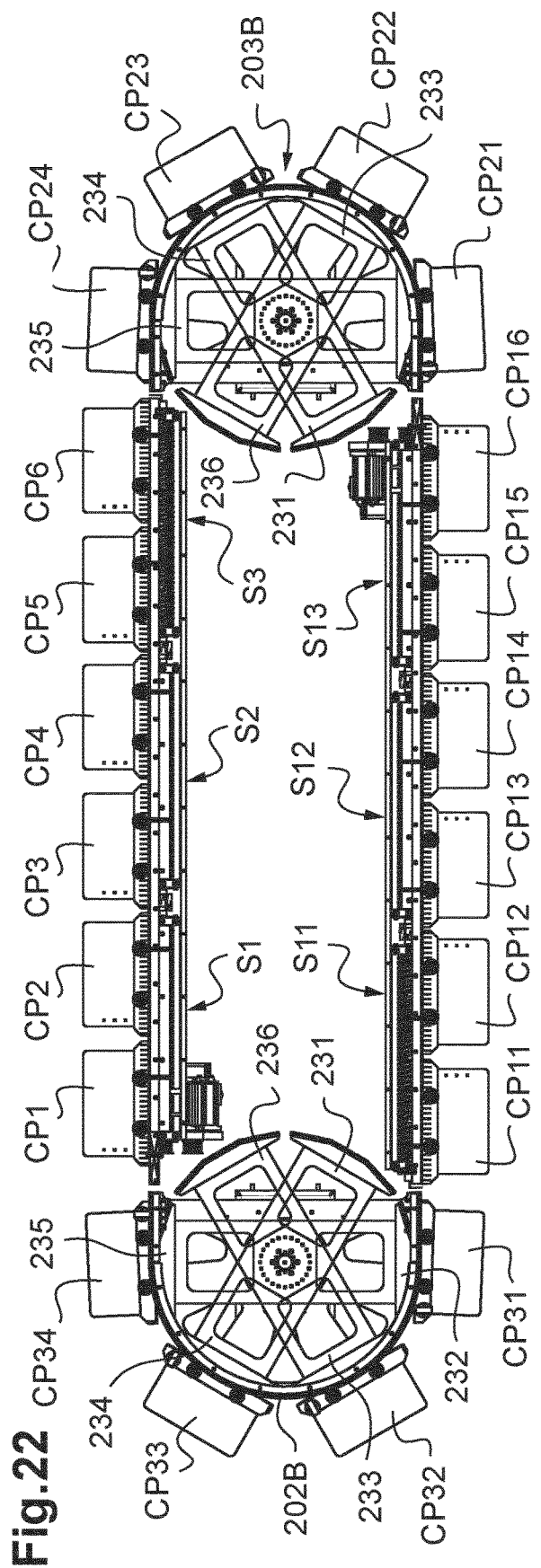
FIGS. 22 to 24 are diagrams illustrating three examples of closed-loop conveyors, as proposed.
Figure 23:
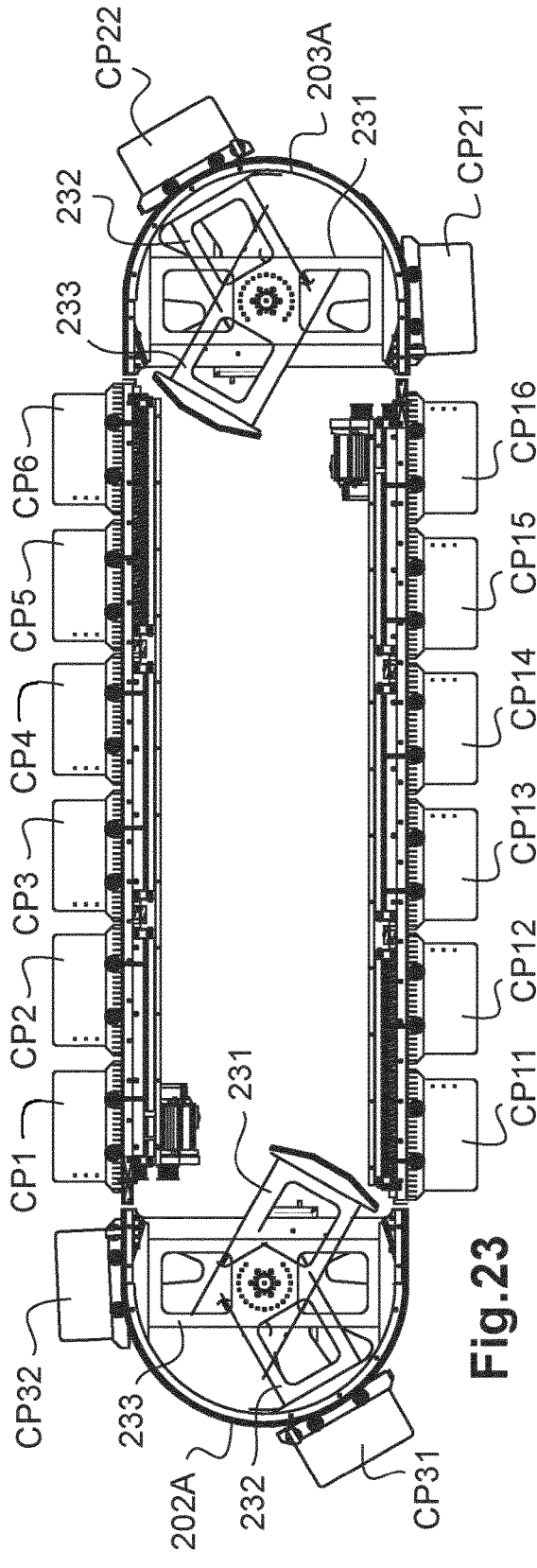

However, it is currently preferred to associate two longitudinal members, or more, with end carrousels, as shown in FIGS. 22 and 23, where the longitudinal members are those in FIG. 21.

In FIG. 23, the end carrousels 202A and 203A each have 3 arms 231 to 233. In FIG. 22, the end carrousels 202B and 203B each have 6 arms 231 to 236.

The arrangement of FIG. 23 can function with a period of down to 0.6 seconds, that in FIG. 22 with a period of down to 0.5 seconds. This period is the time required for a carriage to be replaced by the next in a given working position. In other words, it consists of the time required to move a carriage between two successive positions, for example between the position CP11 and the position CP12 in FIGS. 22 and 23.

In practice, the number of segments on one side of the conveyor is not limited to three. The number can be up to 10 for example, when it is necessary to carry out numerous operations on a part.

Figure 24:
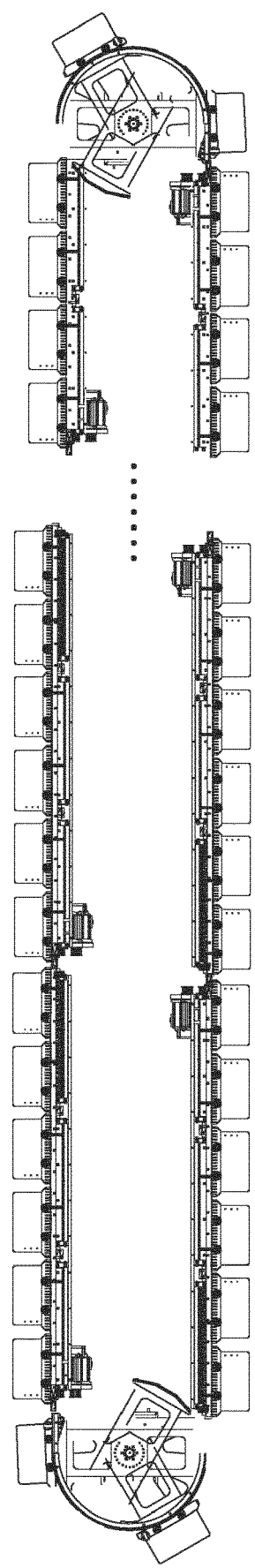

Thus, FIG. 24 shows a conveyor wherein a length comprises several times 6 carriage positions (2 times 1872 mm), followed by an extension to four carriage positions (pitch of 1248 mm).

Finally, a conveyor wherein the geometry is a quadrilateral can be envisaged, the sides whereof are interconnected by four carrousels.

Figure 25:
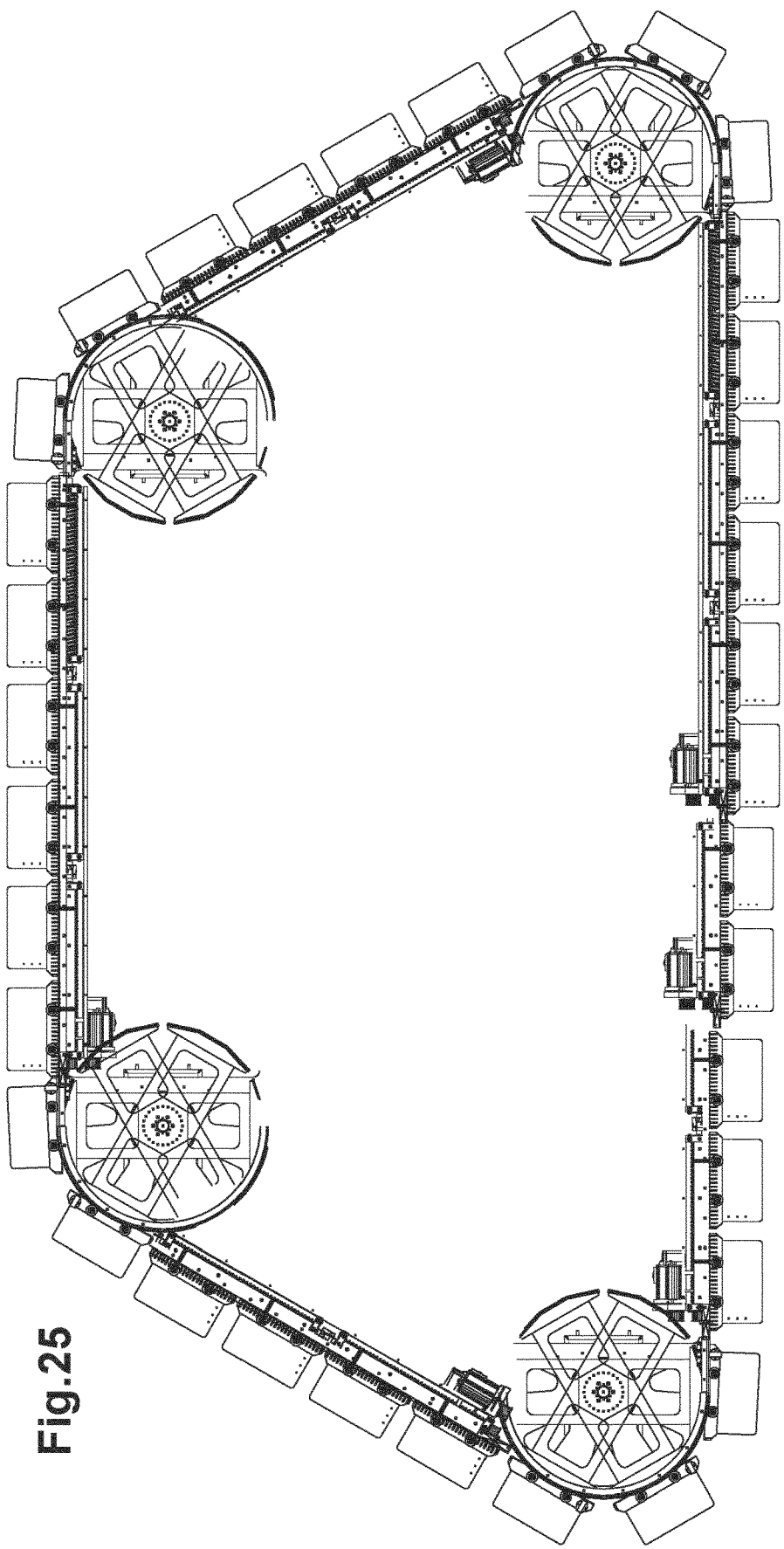
FIGS. 25 and 26 are diagrams illustrating two further examples of closed-loop conveyors, as proposed.

FIG. 25 is an example thereof, according to a general trapezoid shape. The top side has 6 carriage positions. The left and right sides each have four carriage positions. The bottom side has 6+2+1+2=11 carriage positions. And the carrousels have 6 branches. Each side forms a track capable of having one or more transport segments. The tracks can be mutually opposed (for example the two parallel sizes of the trapezoid), or adjacent. The carrousels connect the tracks to one another.

Figure 26:
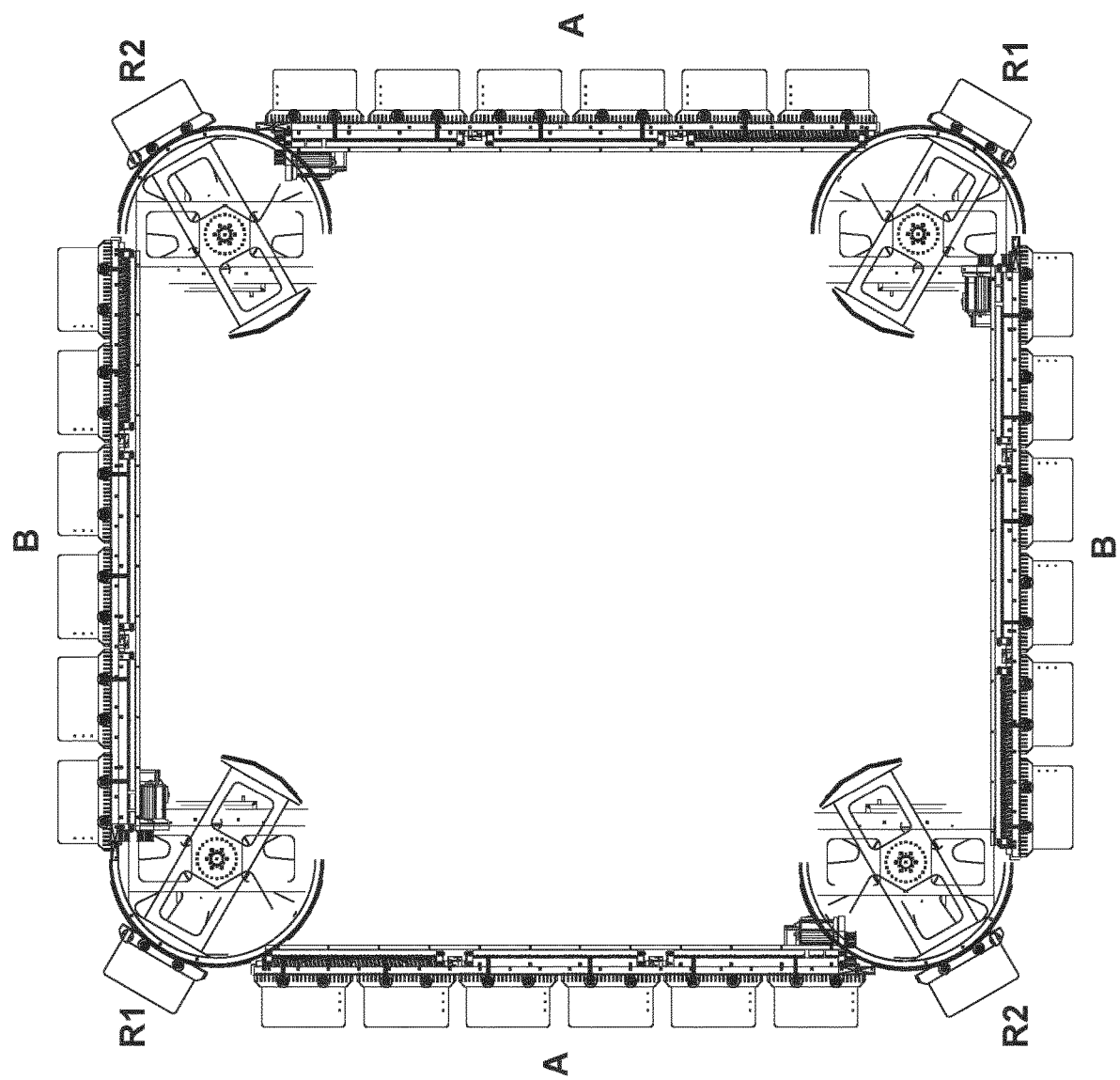

FIG. 26 is a further example thereof, according to a general square shape, wherein each side has 6 carriage positions. Here also, the carrousels have 2 branches.

In an example of operation, the conveyor of FIG. 26 works on two mutually opposed lines A and two mutually opposed lines B. These lines A and these lines B can be disposed in a rectangular or square configuration.

In this case, there can only be one pallet at most on a carrousel. Indeed, there is only 90° between the two lines, which does not allow the storage of more than one carriage on a carrousel.

Figure 27:
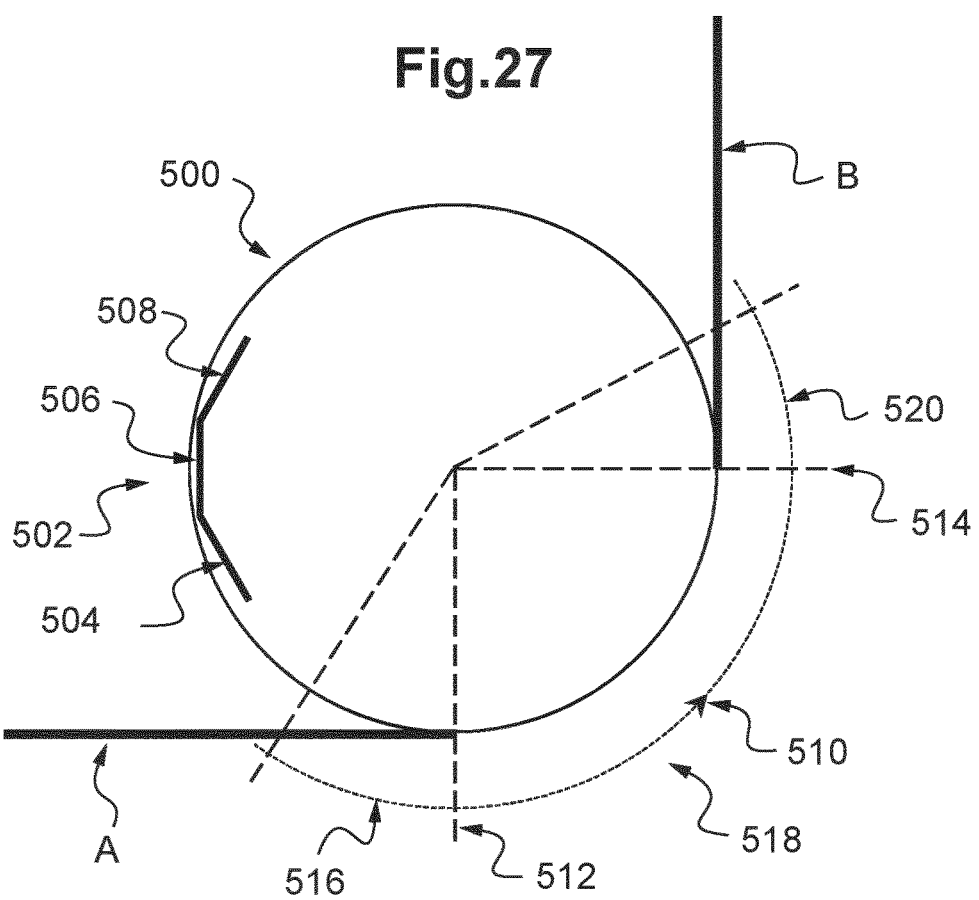
FIG. 27 is a schematic view of the transfer of a carriage to the carrousel of a line A to a line B in the conveyor in FIG. 26.

FIG. 27 shows a schematic view of the transfer of a carriage to a carrousel 500 from a line A to a line B in the square configuration of FIG. 26.

The carrousel 500 has at least one mounting 502, comprising front 504, middle 506 and rear plates 508. The carrousel 500 rotates in the trigonometric direction 510. Alternatively, this direction can be the clockwise direction. The transfer is carried out from a line output position 512.

Loading and unloading of a carriage on the carrousel 500 from a line output 512 to a line input 514 by the current mounting 502 are performed according to the following operations:

a) a loading step 516 where the current mounting initiates the drive of the carriage out of the line A, between −30° and 0° approximately before the line output position 512, b) a transfer step 518 where the current mounting moves the carriage from the line A in the vicinity of the line B, between 0° and 90° after the line output 512, c) an unloading step 520 where the current mounting unloads the carriage on the line B, between 90° and 120° after the line output 512, or between 0° and 30° after the line input 514.

Transfer from a line B to a line A is carried out according to the same operations.

Figure 28:
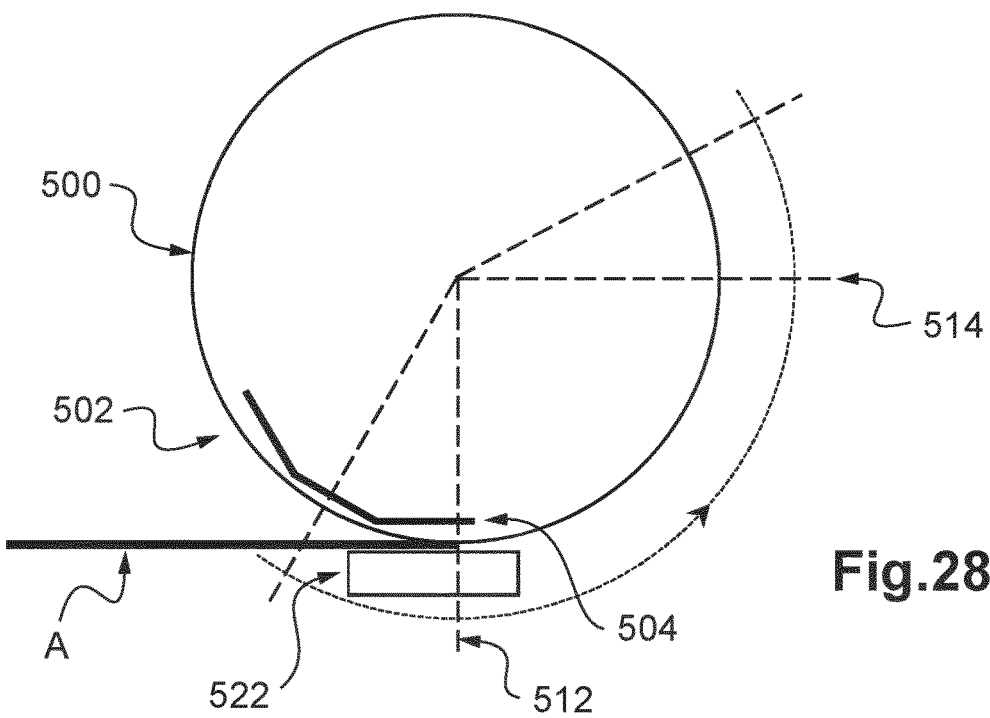

FIGS. 28 and 29 are schematic views of the loading of a carriage on a carrousel.

In a use, the loading step a) 516 on a carrousel can be carried out in two phases:

d) the front plate 504 of the current mounting 502 initiates the loading of a carriage 522 on the carrousel 500, when the current mounting 502 is at approximately −30° with respect to the line output 512, then e) the carrousel 500 rotates gradually from the position −30° to the position 0° with respect to the line output 512, the middle plate 506 then taking over, either gradually or suddenly, from the front plate 504 to continue and complete the drive of the carriage 522 out of the line A.

The unloading step c) 520 of a carrousel on a line is carried out in a similar manner, other than that the two steps d) and e) are inverted and the transfer is made between the middle plate 506 and the rear plate 508. In other words:

f) the middle plate 506 initiates the unloading of the carriage 522 the line B, when the current mounting 502 is at approximately 0° with respect to the line input 514, then g) the carrousel 500 rotates gradually from the position −30° to the position 0° with respect to the line input 514, the rear plate 508 taking, either gradually or suddenly, from the middle plate 506 to continue and complete the unloading of the carriage 522 on the line B.

Thus, when a carrousel 500 is loaded, a line is unloaded. When a carrousel 500 is unloaded, a line is loaded. A line is loaded at the level of the line input 514 thereof. A line is unloaded at the level of the line output 512 thereof.

Thus, a total of 150° is required to carry out the entire transfer of a carriage between the lines A and B. Furthermore, at least 120° deviation is required between two mountings 502 of a carrousel 500 in such a square configuration, in the best-case scenario where a carriage could be loaded on a mounting while unloading another carriage, in the same movement of 30°. Hence:

the carrousels comprise at most three branches and three mountings, preferably one or two branches and as many mountings, and the carrousels can only transfer a single carriage at a time.

The operating mode of a conveyor in a square configuration as in FIG. 26 is asynchronous. In other words, the lines A and the lines B do not operate by being synchronized but being offset; on the other hand, the two lines A are synchronized and the two lines B also. Indeed, in such a square line configuration, it is not possible to load and unload two successive carrousels R1 and R2 at the same time as seen above.

More specifically, the steps of loading the carrousels R1 are performed at the same time as the steps of unloading the carrousels R2, and vice-versa. Thus, the carrousels R1 are not transferring a carriage while the carrousels R2 do so, and vice-versa.

Each carrousel is associated with a line A and a line B. Each line A is associated with a carrousel R1 at the line input and a carrousel R2 at the line output. Each line B is associated with a carrousel R2 at the line output and a carrousel R1 at the line input.

Thus, if the entire trajectory along a conveyor is followed, in a closed cycle, a first line A is passed onto, followed by a first carrousel R2, then a first line B, then a first carrousel R1, then again a second line A, then a second carrousel R2, then a second line B, then a second carrousel R1, then again the first line A.

A complete operating cycle for a square configuration is carried out according to the following steps:

h) each carrousel R1 loads a carriage from the output of the line B thereof, and each carrousel R2 unloads a carriage on the input of the line B thereof, the carrousels R1, now loaded, transfer the respective loaded carriages thereof to the lines B thereof to the respective lines A thereof to prepare the initiation of an unloading on the respective line A thereof, and at the same time the carrousels R2, now empty, move the next available mounting thereof in the vicinity of the output of the respective line A thereof to prepare the initiation of a loading, each carrousel R1 unloads the loaded carriage thereof on the input of the line A thereof, each carrousel R2 loads a new carriage from the output of the line A, and the carrousels R2, now loaded, transfer the respective loaded carriages thereof from the lines A thereof to the respective lines B thereof to prepare the initiation of an unloading on the respective line B thereof, and at the same time the carrousels R1, now empty, move the next available mounting thereof in the vicinity of the output of the respective line B thereof to prepare the initiation of a loading, Steps h and j are carried out on an angular amplitude of approximately 30°. Steps i and k are carried out on an angular amplitude of 90° for the loaded carrousels, and for the empty carrousels:

210° for the empty carrousel when the carrousels have one branch,

30° when the carrousels have two branches, and

0° when the carrousels have three branches.

The latter angular amplitude corresponding to the angular distance to be travelled when a mounting of a carrousel has just finished an unloading so that the next mounting is positioned to initiate a new loading. The next mounting optionally being the same in the case of a carrousel with one branch.

Thus, it is noted that when the carrousels have three branches and there is 90° between two lines (in the case of a square configuration), the loading of a carrousel and the unloading of the same carrousel can be carried out simultaneously.

The switching of the status of lines A and the status of lines B is referred to as a half-cycle. This switching corresponds to the sequence of a loading-unloading step followed by a transfer step (i.e. a step h or j followed by a step i or k). According to the configurations, this switching is carried out over a duration of down to 0.5 seconds, or to one second. Between two switches, the carriages are immobile to enable the rest of the line to operate.

For a square configuration, the duration of a switch is 0.5 s in the case of carrousels with three branches and 1 s in the case of carrousels with one or two branches.

In further alternative embodiments, the operating cycle can be synchronous. In particular, in a configuration as described in FIGS. 22 and 23, the operating mode can be synchronous.

For each carriage, the vertical space next to the part-bearing deck 19 is free. Therefore, it can be envisaged that the carriage bears an item of equipment capable of moving the part in the vertical direction.

The system described has various advantages.

Firstly, the holding of a carriage in position is independent of any external power or mechanical attachment since it is due to the attraction between the magnets and the worm. It is therefore possible to remove a carriage or position it without any tools or power outage, for example manually. Conversely, the carriage remains in position in the event of a power outage.

It is therefore possible to work on a carriage which remains in position in front of an operator in complete safety, which enables easy adjustment of the carriage positions.

Then, the conveyor can operate in the presence of liquids (oils, solvents, etc.).

The pallet can be moved in the operating position (+/−0.5 mm, centering) without disturbing the system, i.e. the motor will not try to compensate for this movement provided that it remains within a certain limit. In other words, the system is provided with "de facto" compliance.

In a further embodiment, illustrated in FIG. 30, the bearing deck 19 can be disposed on top of and centered on the carriage 10 and not offset. This arrangement has the advantage being more balanced, which reduces the leverage applied on the carriages, and therefore improves the stability of said carriages. This configuration is furthermore more compact, which makes it possible to increase the profitability per m2, an important criterion in a production line. On the other hand, this arrangement does not allow access from below to the contents of the carriage to work on the product conveyed thereby.

In a further embodiment, illustrated in FIG. 31, the bearing deck 19 is partially vertical. This also increases the compactness and surface profitability of the line, and is well suited for products required to be processed vertically.

These alternative arrangements are merely examples, and the invention offers flexibility and versatility in the choice of the arrangement of the deck on the carriage, according to the needs of the production line.

In some embodiments, as presented in FIG. 6, there is not one but several worms which convey the carriages along a line. These worms can then not be attached but spaced so as to enable the arrangement of the motor-screw transmission.

In this case, a steel plate 600 can be disposed between all the or some successive worm pairs on these lines (or transport segment). These steel plates 600 increase the force of magnetic attraction which holds the carriage on the line between two successive worms. Indeed, when the carriage transits between two worms, the number of turns which holds the carriage via the plates decreases, and these steel plates 600 make it possible to compensate for this loss of attraction greatly.

In the same aim, each line can comprise two steel plates 602, one at the line input and one at the line output. These steel plates 602 reinforce the stability of the carriages during a transfer between a line and a carrousel.

The invention claimed is:

1. Transfer device comprising a central structure (20), having at least one transport segment (S21, S22, S23), with drive means (30-1, 30-2, 30-3), the at least one transport segment configured to receive a carriage (10), movably mounted with respect to the central structure, in a direction of movement, each carriage having a plate (11) bearing a series of permanent magnets (110), in the direction of movement, the drive means (30) comprise a worm (30), along the at least one transport segment (S21, S22, S23), said worm comprising a ferromagnetic helical perimeter (301, 302, 303), while being mounted so as to be rotatable about an axis parallel to said direction of movement, and arranged such that successive turns (301, 302, 303) of the helical perimeter are adjacent to at least some of the permanent magnets (110) of said series, the carriage (10) being held in place on the at least one transport segment (S21, S22, S23) by an attraction between the permanent magnets (110) and the worm (30), the at least one transport segment is defined on rails (36, 38) and the rails (36, 38) are vertical with respect to one another.

2. The device according to claim 1, wherein the central structure (20) comprises a table, on two sides thereof two tracks are defined each having at least one transport segment (S21, S22, S23; S11, S12, S13), while at least one end portion (202, 203) is placed at least one of the two ends of the table, to form at least one rotation segment (S30, S31) provided with drive means (230) for moving a carriage from one to the other of said tracks (S21, S22, S23; S11, S12, S13).

3. The device according to claim 2, wherein at least some of the transport segments (S21, S22, S23; S11, S12, S13) have worms (30).

4. The device according to claim 3, wherein all the transport segments (S21, S22, S23; S11, S12, S13) have worms (30).

5. The device according to claim 2, wherein the drive means (230) of the rotation segment are arranged (231, 232, 233) to cooperate with the permanent magnets (110) of the plate (11) of a carriage.

6. The device according to claim 5, wherein the drive means of a rotation segment comprise a wheel (230) provided with permanent magnet plates (2310, 2311, 2312) homologous with those of a carriage.

7. The device according to claim 1, wherein the worm (30) has two interlaced helices.

8. The device according to claim 1, further comprising a stop device (80), arranged to lock a carriage (10) in a selected position on a transport segment.

9. The device according to claim 1, wherein the carriage (10) has a part-bearing deck (19).

10. The device according to claim 1, wherein the carriage (20) has at least two rollers (16-1, 16-2) configured to be engaged with one of the rails (36) and several wheels (17-1, 17-2, 17-3) configured to bear on the other rail (38).

11. The device according to claim 1, wherein the permanent magnets comprise flat parallelogram-shaped strips (110).

12. The device according to claim 11, wherein the strips are regularly distributed according to a pitch which corresponds to the pitch of the magnetic helical perimeter, and according to an inclination of an angle which corresponds to the angle of the magnetic helical perimeter of the worm.

* * * * *